(12) United States Patent
Ozaki et al.

(10) Patent No.: US 6,574,977 B2
(45) Date of Patent: Jun. 10, 2003

(54) HEAT PUMP CYCLE

(75) Inventors: Yukikatsu Ozaki, Gamagori (JP); Tadashi Hotta, Nishio (JP); Motohiro Yamaguchi, Hoi-gun (JP); Yasushi Yamanaka, Nakashima-gun (JP)

(73) Assignees: Nippon Soken, Inc., Nishio (JP); Denso Corporation, Kariya (JP)

( * ) Notice: Subject to any disclaimer, the term of this patent is extended or adjusted under 35 U.S.C. 154(b) by 0 days.

(21) Appl. No.: 09/909,539

(22) Filed: Jul. 20, 2001

(65) Prior Publication Data

US 2002/0007943 A1 Jan. 24, 2002

(30) Foreign Application Priority Data

Jul. 21, 2000 (JP) .................................... 2000-220910
Apr. 18, 2001 (JP) .................................... 2001-120160

(51) Int. Cl.[7] ................................................ F25B 9/00
(52) U.S. Cl. ........................... 62/210; 62/222; 62/238.6
(58) Field of Search ........................... 62/210, 211, 212, 62/222, 223, 224, 225, 228.1, 228.3, 238.6, 238.7, 204

(56) References Cited

U.S. PATENT DOCUMENTS

| | | | | | |
|---|---|---|---|---|---|
| 4,492,092 | A | * | 1/1985 | Smorol et al. | 62/181 |
| 4,680,941 | A | * | 7/1987 | Richardson et al. | 62/184 |
| 4,955,207 | A | * | 9/1990 | Mink | 62/238.6 |
| 5,890,370 | A | | 4/1999 | Sakakibara et al. | 62/222 |

* cited by examiner

Primary Examiner—Harry B. Tanner
(74) Attorney, Agent, or Firm—Harness, Dickey & Pierce, PLC

(57) ABSTRACT

In a heat pump cycle, a first high-pressure side heat exchanger is disposed to perform a heat exchange between refrigerant discharged from a compressor and a first fluid, and a second high-pressure side heat exchanger is disposed to perform a heat exchanger between refrigerant from the first high-pressure side heat exchanger and a second fluid having a temperature lower than that of the first fluid. Accordingly, a heat quantity obtained from the heat pump cycle is the sum of a heat amount obtained from the first high-pressure side heat exchanger and a heat amount obtained from the second high-pressure side heat exchanger.

12 Claims, 15 Drawing Sheets

HEAT PUMP CYCLE

CROSS-REFERENCE TO RELATED APPLICATION

This application is related to Japanese Patent Applications No. 2000-220910 filed on Jul. 21, 2000, and No. 2001-120160 filed on Apr. 18, 2001, the contents of which are hereby incorporated by reference.

BACKGROUND OF THE INVENTION

1. Field of the Invention

The present invention relates to a super-critical (trans-critical) heat pump in which a discharge pressure of refrigerant from a compressor exceeds the critical pressure of the refrigerant in a heat pump cycle for transferring heat in a low temperature side to a high temperature side, and is effectively applied to the one using carbon dioxide as a refrigerant.

2. Description of Related Art

In a vapor compressing cycle described in U.S. Pat. No. 5,890,370, a discharge pressure of refrigerant from a compressor exceeds the critical pressure of refrigerant, and a high-pressure side refrigerant pressure is controlled based on a refrigerant temperature at an outlet side of a radiator (high-pressure side heat exchanger). In this connection, when the inventors built a prototype of a heat pump cycle for heating hot water in a high-pressure side heat exchanger using the vapor compressing cycle, the following problem occurred.

That is, in this cycle, because hot water supplied for heating is repeatedly circulated between the high-pressure side heat exchanger and a heating heat exchanger, the temperature of the hot water flowing into the high-pressure side heat exchanger gradually increases. For this reason, a difference in temperature between the refrigerant and the hot water gradually decreases in the high-pressure side heat exchanger, so that the heat quantity (enthalpy) to be extracted from a heat pump gradually decreases and hence the coefficient of performance (COP) of the heat pump gradually deteriorates.

With respect to this problem, it is thought to take measures of increasing the high-pressure side refrigerant temperature (high-pressure side refrigerant pressure) to prevent a difference in temperature between the refrigerant and the hot water from decreasing. However, it is essential only that the temperature of the hot water is increased to a temperature enough for heating. When the high-pressure side refrigerant temperature is increased to ensure the difference in temperature between the refrigerant and the hot water, a refrigerant pressure is increased more than a necessary refrigerant pressure, and therefore, the power consumption of the compressor increases unnecessarily.

SUMMARY OF THE INVENTION

In view of the foregoing problems, it is an object of the present invention to provide a heat pump cycle which prevents the quantity of heat (enthalpy) to be obtained from a heat pump from decreasing and hence the coefficient of performance (COP) of the heat pump from becoming worse.

According to the present invention, a heat pump cycle includes a compressor for compressing refrigerant to a pressure higher than critical pressure of refrigerant, a first high-pressure side heat exchanger disposed to perform a heat exchange between refrigerant discharged from the compressor and a first fluid, a second high-pressure side heat exchanger disposed to perform a heat exchange between refrigerant flowing from the first high-pressure side heat exchanger and a second fluid having a temperature lower than that of the first fluid, a decompression unit disposed for controlling the pressure of refrigerant discharged from the compressor and for decompressing refrigerant flowing from the second high-pressure side heat exchanger, and a low-pressure side heat exchanger disposed to evaporate refrigerant decompressed in the decompression unit. Accordingly, a heat quantity obtained in a heat pump of the heat pump cycle becomes the sum of a heat quantity to be extracted in the first high-pressure side heat exchanger and a heat quantity to be extracted in the second high-pressure side heat exchanger. Thus, in the heat pump cycle, it can prevent the heat quantity to be extracted from the heat pump from decreasing and hence the coefficient of performance (COP) of the heat pump from becoming worse.

Preferably, a refrigerant temperature detecting device is disposed for detecting a refrigerant temperature between the first high-pressure side heat exchanger and the second high-pressure side heat exchanger, and the decompression unit controls the refrigerant pressure discharged from the compressor to become equal to or lower than a predetermined pressure based on the refrigerant temperature between the first high-pressure side heat exchanger and the second high-pressure side heat exchanger. Accordingly, the refrigerant pressure discharged from the compressor becomes higher, and the temperature of the first fluid can be sufficiently increased.

Preferably, fuel cells are disposed in the fluid circuit to generate electricity by chemically reacting hydrogen and oxygen, and the first high-pressure side heat exchanger is disposed in the fluid circuit to heat the first fluid flowing into the fuel cells. Therefore, the fuel cells can be heated using the heat pump, while the COP of the heat pump can be improved.

BRIEF DESCRIPTION OF THE DRAWINGS

Additional objects and advantages of the present invention will be more readily apparent from the following detailed description of preferred embodiments when taken together with the accompanying drawings, in which.

DETAILED DESCRIPTION OF THE PRESENTLY PREFERRED EMBODIMENTS

Preferred embodiments of the present invention will be described hereinafter with reference to the accompanying drawings.

(First Preferred Embodiment)

Figure 1:
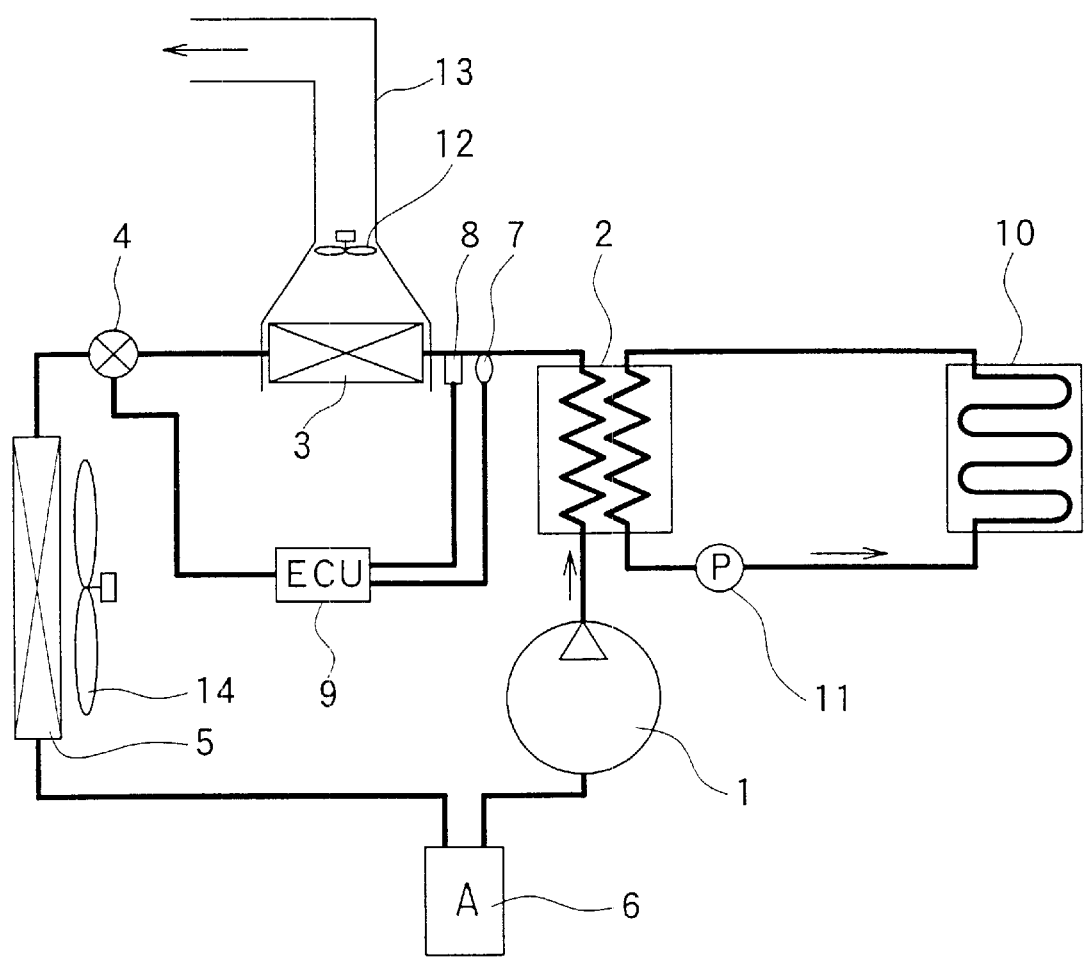
FIG. 1 is a schematic diagram showing a heat pump cycle according to a first preferred embodiment of the present invention.

In the first preferred embodiment, a heat pump cycle of the present invention is typically applied to a heating device used for a home. FIG. 1 is a schematic diagram showing a heating device used for the home in accordance with the first embodiment. In the heat pump cycle of FIG. 1, a compressor 1 sucks a refrigerant (e.g., carbon dioxide in the present preferred embodiment) and compresses the refrigerant to a pressure not less than the super-critical pressure of the refrigerant. A first high-pressure side heat exchanger 2 is disposed to perform a heat exchange between a high pressure refrigerant discharged from the compressor 1 and hot water supplied for heating a floor (hereinafter referred to as hot water).

A second high-pressure side heat exchanger (supplementary heat exchanger) 3 is disposed to perform a heat exchange between the high pressure refrigerant flowing out from the first high-pressure side heat exchanger 2 and air blown into a bathroom (not shown). An electronic pressure control valve 4 (pressure reducing device) is provided for reducing the pressure of the high-pressure refrigerant flowing out of the second high-pressure side heat exchanger 3 and for controlling the pressure of the refrigerant at the high-pressure side (discharge pressure of the compressor 1) in a heat pump. There is provided a low-pressure side heat exchanger (evaporator) 5 which evaporates the low pressure refrigerant decompressed in the pressure control valve 4 by absorbing heat from outside air (outdoor air). An accumulator (gas-liquid separation unit) 6 is disposed for accumulating an excess refrigerant in the heat pump, and for separating the refrigerant flowing out from the low-pressure side heat exchanger 5 into gas refrigerant and liquid refrigerant. Gas refrigerant separated in the accumulator 6 flows into the suction side of the compressor 1.

The temperature (hereinafter referred to as a high-pressure refrigerant temperature Tout) of the refrigerant between the first high-pressure side heat exchanger 2 and the second high-pressure side heat exchanger 3 is detected by a refrigerant temperature sensor (refrigerant temperature detecting device) 7, and the pressure (hereinafter referred to as a high-pressure side refrigerant pressure Ph) of the refrigerant between the first high-pressure side heat exchanger 2 and the second high-pressure side heat exchanger 3 is detected by a refrigerant pressure sensor (refrigerant pressure detecting device) 8. The detection signals of both the sensors 7, 8 are input to an electronic control unit (ECU) 9, and the ECU 9 regulates an opening degree of the pressure control valve 4 according to a program set previously based on the detection signals of both the sensors 7, 8.

A heater 10, for heating the floor in the house by using hot water heated by the first high-pressure side heat exchanger 2, is disposed. A pump 11 is disposed in a water circuit, for circulating the hot water between the first high-pressure side heat exchanger 2 and the heater 10. A bathroom-heating (drying) blower 12, for blowing air heated by the second high-pressure side heat exchanger 3 into the bathroom is disposed at a downstream air side of the second high-pressure side heat exchanger 3. The second high-pressure side heat exchanger 3 and the blower 12 are accommodated in an air duct 13 defining an air passage through which air flows into the bathroom. In addition, an outside air blower 14 for blowing outside air toward the low-pressure side heat exchanger 5 is disposed.

Figure 2:
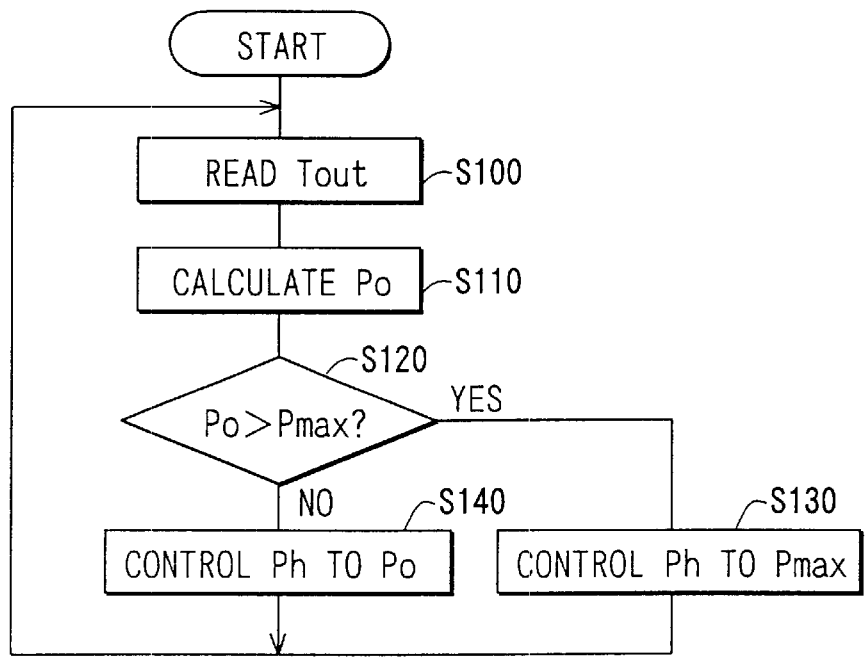
FIG. 2 is a flow diagram showing control operation of a heat pump of the heat pump cycle according to the first embodiment.

Next, operation of the heat pump cycle in accordance with the first preferred embodiment will be described based on the flow diagram shown in FIG. 2.

When a starting switch (not shown) of the heat pump is turned on, first, the high-pressure side refrigerant temperature Tout is read at step S100. Next, a target high-pressure side refrigerant pressure Po corresponding to the high-pressure side refrigerant temperature Tout is calculated based on a control map (not shown), at step S110. Then, it is determined whether the calculated target high-pressure side refrigerant pressure Po is larger than a permissible maximum pressure Pmax or not, at step S120.

When the target high-pressure side refrigerant pressure Po is larger than the permissible maximum pressure Pmax, the opening degree of the pressure control valve 4 is controlled so that the high-pressure side refrigerant pressure Ph becomes the permissible maximum pressure Pmax at step S130. On the other hand, when the target high-pressure side refrigerant pressure Po is smaller than the maximum pressure Pmax, the opening degree of the pressure control valve 4 is controlled so that the high-pressure side refrigerant pressure Ph becomes the target high-pressure side refrigerant pressure Po at step S140.

In the first embodiment, the target high-pressure side refrigerant pressure Po means a high-pressure side refrigerant pressure to maximize the coefficient of performance (COP) of the heat pump with respect to the high-pressure side refrigerant temperature Tout. An optimal control line ηmax of the present invention is set in such a manner that it is along an equivalent density line of about 600 kg/m$^3$, when the high-pressure side refrigerant pressure is in a super-critical range higher than the critical pressure of the refrigerant. On the other hand, when the high-pressure side refrigerant pressure is lower than the critical pressure of the refrigerant, the optimal control line ηmax is set at a super-cooling degree of about 5° C. Here, the permissible maximum pressure Pmax is suitably selected according to the heat resistance temperature (permissible) and the permissible pressure of the compressor 1, and is set at 12 Mpa in the first embodiment, for example.

Next, the features of the first embodiment will be described. In the first embodiment, refrigerant in the first high-pressure side heat exchanger 2 performs a heat exchange with the hot water circulating in a closed hot-water circuit between the first high-pressure side heat exchanger 2 and the heater 10. On the other hand, refrigerant in the second high-pressure side heat exchanger 3 performs a heat exchange with air flowing through an opened air passage in the duct 13. For this reason, the temperature of the hot water flowing into the first high-pressure side heat exchanger 2 gradually increases, whereas a temperature increase of air flowing into the second high-pressure side heat exchanger 3 (this air is hereinafter referred to as suction air) is sufficiently small as compared with a temperature increase of the hot water.

Thus, immediately after the heat pump is started, both of the temperature difference between the hot water and the refrigerant in the first high-pressure side heat exchanger 2 and the temperature difference between the suction air and the refrigerant in the second high-pressure side heat exchanger 3 are comparatively large. However, after the heat pump is started, the temperature of the hot water gradually increases to reduce the temperature difference between the hot water and the refrigerant in the first high-pressure side heat exchanger 2. On the other hand, a reduction in the temperature difference between the suction air and the refrigerant in the second high-pressure side heat exchanger 2 is sufficiently small as compared with a reduction in the temperature difference between the hot water and the refrigerant in the first high-pressure side heat exchanger 2, because an increase in the temperature of the suction air is sufficiently small as compared with an increase in the temperature of the hot water. For this reason, when the temperature difference between the hot water and the refrigerant in the first high-pressure side heat exchanger 2 decreases and the quantity of heat (enthalpy) to be extracted in the first high-pressure side heat exchanger 2 remarkably decreases, the temperature of the hot water flowing into the first high-pressure side heat exchanger 2 is higher than the temperature of air flowing into the second high-pressure side heat exchanger 3.

Figure 3:
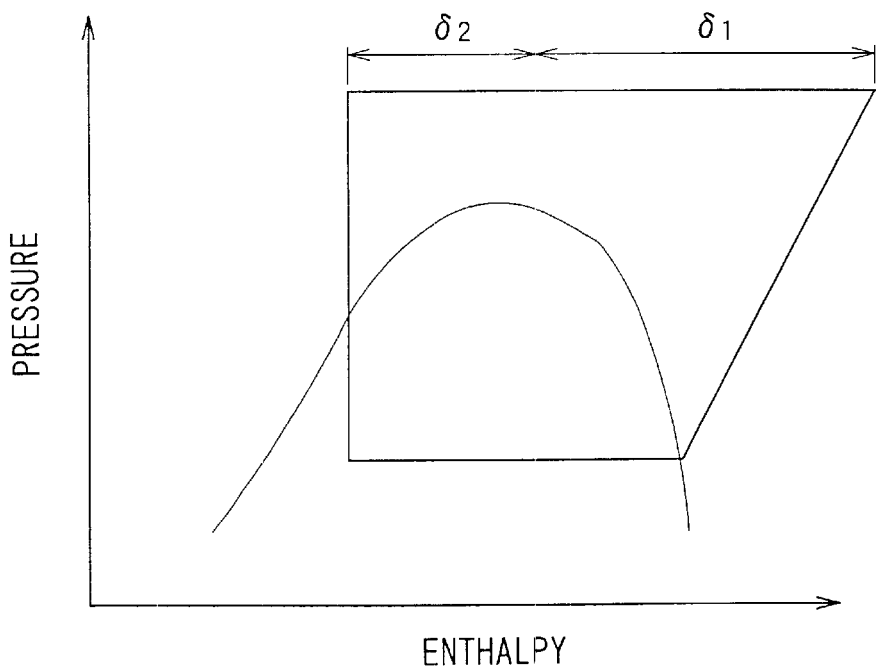
FIG. 3 is a p-h diagram (Mollier diagram) of the heat pump according to the first embodiment.

Therefore in the first embodiment, even in the case where the heat quantity (enthalpy) to be extracted in the first high-pressure side heat exchanger 2 remarkably decreases, heat (enthalpy) can be extracted from the refrigerant in the second high-pressure side heat exchanger 3. Accordingly, as shown in FIG. 3, the heat (enthalpy) to be extracted in the heat pump in accordance with the first embodiment becomes the sum of the heat quantity $\delta 1$ to be extracted in the first high-pressure side heat exchanger 2 and the heat quantity $\delta 2$ to be extracted in the second high-pressure side heat exchanger 3, as shown in FIG. 3.

Thus, in the heat pump cycle of the first embodiment, it can prevent the heat quantity to be extracted from the heat pump from decreasing and hence the coefficient of performance (COP) of the heat pump from becoming worse.

In this regard, since the opening degree of the pressure control valve 4 is controlled such that the high-pressure side refrigerant temperature Tout and the high-pressure side refrigerant pressure Ph keep the relationship shown by the optimal control line $\eta$max, as the high-pressure side refrigerant temperature Tout increases, the target high-pressure side refrigerant pressure Po (i.e., high-pressure side refrigerant pressure Ph) increases. However, in the first embodiment, because the temperature of the hot water is not controlled, if the heat pump is kept operating, the temperature of the hot water and the high-pressure side refrigerant pressure Ph increase excessively, the compressor 1 may be damaged.

Accordingly, in the present preferred embodiment, because the high-pressure side refrigerant pressure Ph (discharge pressure) is controlled based on the high-pressure side refrigerant temperature Tout so that the high-pressure side refrigerant pressure Ph is smaller than the permissible maximum pressure Pmax, it is possible to prevent the compressor 1 from being broken.

Figure 4:
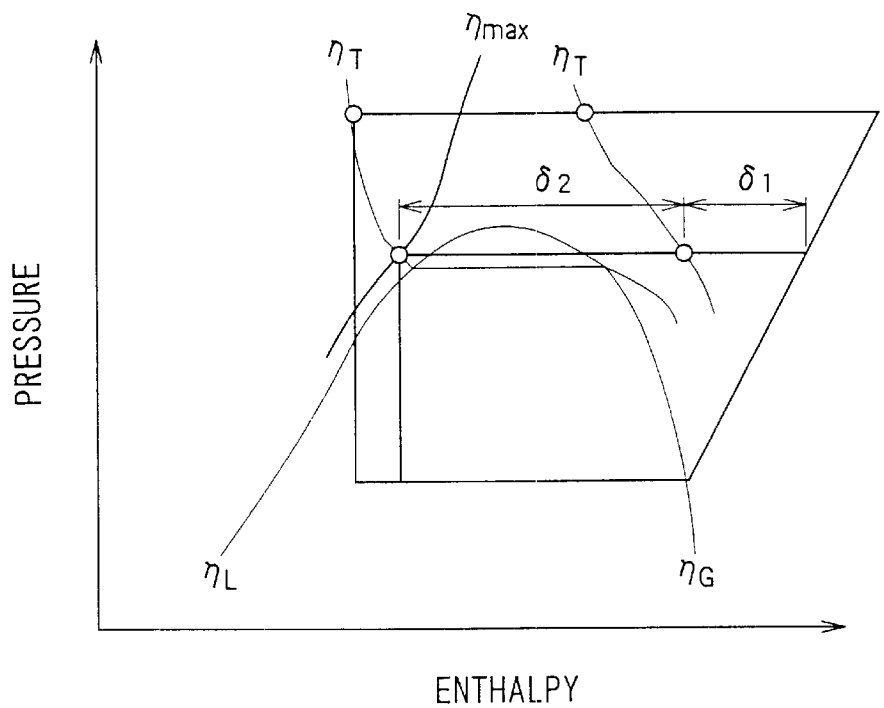
FIG. 4 is a p-h diagram of a heat pump in a comparison example, where a refrigerant pressure discharged from a compressor is controlled based on a refrigerant temperature at a refrigerant outlet side of a second high-pressure side heat exchanger.

The opening degree of the pressure control valve 4 is controlled so that the high-pressure side refrigerant temperature Tout and the high-pressure side refrigerant pressure Ph have the relationship shown by the optimal control line $\eta$max. If the high-pressure side refrigerant temperature Tout is detected at the outlet side of the second high-pressure side heat exchanger 3, the detected high-pressure side refrigerant temperature Tout becomes low, and hence the target high-pressure side refrigerant pressure Po (=high-pressure side refrigerant pressure Ph) also becomes low, as shown in FIG. 4. In this case, it impossible to increase the temperature of the hot water to a high temperature enough for heating. In FIG. 4, $\eta$max means the optimal control line, $\eta$T means the isothermal line, $\eta$G means the saturated vapor line, and $\eta$L means the saturated liquid line.

In contrast to this, in the first embodiment, the high-pressure side refrigerant temperature Tout is detected by the refrigerant temperature sensor 7 between the first high-pressure side heat exchanger 2 and the second high-pressure side heat exchanger 3, it can prevent the target high-pressure side refrigerant pressure Po (high-pressure side refrigerant pressure Ph) from becoming low. Therefore, the temperature of the hot water can be sufficiently increased to a high temperature enough for heating.

Figure 5:
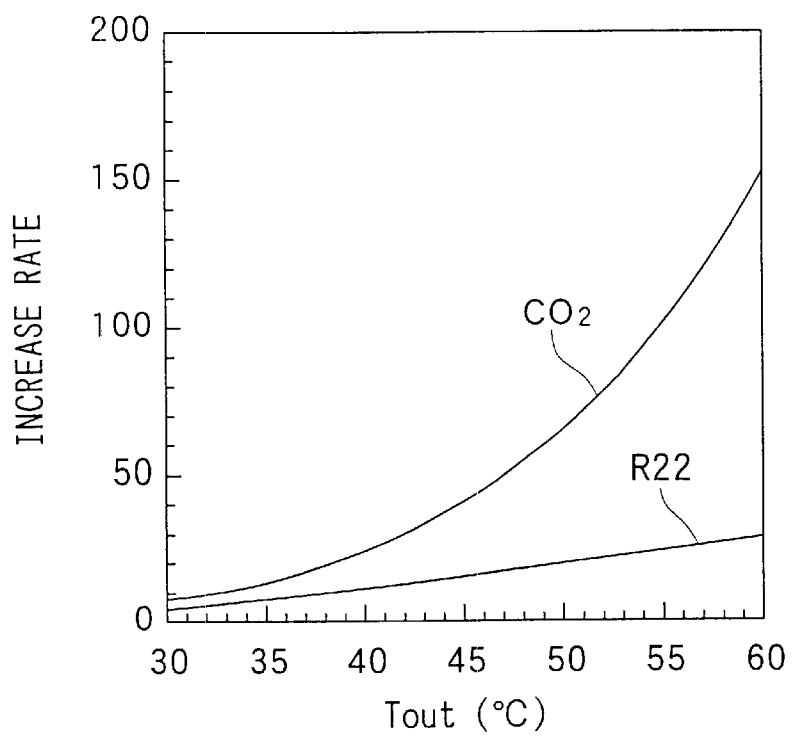
FIG. 5 is a graph showing an enthalpy increased rate in the heat pump according to the first embodiment.

FIG. 5 is a graph showing the relationship between an increase rate of heat quantity (the increase rate of the enthalpy difference) to be extracted from the heat pump and the high-pressure side refrigerant temperature Tout according to the first embodiment. As shown in FIG. 5, according to the first embodiment, irrespective of the kind of the refrigerant, it is possible to prevent the quantity of heat (enthalpy) to be extracted from the heat pump from decreasing, as the high-pressure side refrigerant temperature Tout increases. As a result, it can prevent the coefficient of performance (COP) of the heat pump from becoming worse.

In the first embodiment, when the temperature of air to be blown into the bathroom needs to be further increased, a heating unit such as an electric heater may be provided in the duct 13. Further, it is possible to stop the pump 11 and only to heat (dry) the bathroom.

(Second Preferred Embodiment)

In the above-described first embodiment, the permissible maximum pressure Pmax is fixed at a specific value. However, in the second embodiment, the permissible maximum pressure Pmax is changed based on outside air temperature. The permissible maximum pressure Pmax also can be changed based on the refrigerant pressure (evaporation pressure) in the low-pressure side heat exchanger 5 or the refrigerant temperature (evaporation temperature) in the low-pressure side heat exchanger 5. Here, the permissible maximum pressure Pmax can be set to become higher in accordance with an increase of the evaporation pressure or the evaporation temperature in the low-pressure side heat exchanger 5.

That is, the temperature of refrigerant discharged from the compressor 1 is determined by the discharge pressure (high-pressure side refrigerant pressure) of refrigerant discharged from the compressor 1 and the refrigerant temperature (i.e., evaporation temperature) sucked into the compressor 1 or the refrigerant pressure (i.e., evaporation pressure) sucked into the compressor 1. Therefore, even if the pressure of refrigerant discharged from the compressor 1 is constant (the same value), as the refrigerant temperature (refrigerant pressure) sucked into the compressor 1 decreases, the refrigerant temperature discharged from the compressor 1 increases.

For this reason, even if the high-pressure side refrigerant pressure Ph is not more than the permissible maximum pressure Pmax, the refrigerant temperature discharged from the compressor 1 sometimes exceeds a permissible heat-resistance temperature of the compressor 1. On the contrary, even if the high-pressure side refrigerant pressure Ph is not more than the permissible maximum pressure Pmax, sometimes, it is impossible to sufficiently heat the hot water to a high temperature because the refrigerant temperature discharged from the compressor 1 is low.

Accordingly, in the second embodiment, the permissible maximum pressure Pmax is changed so that the permissible maximum pressure Pmax increases in response to an increase in the evaporation pressure (outside air temperature) in the low-pressure side heat exchanger 5. Accordingly, the pressure control valve 4 is controlled to sufficiently heat the hot water and to make the refrigerant temperature discharged from the compressor 1 lower than the heat-resistance temperature of the compressor 1.

Figure 6:
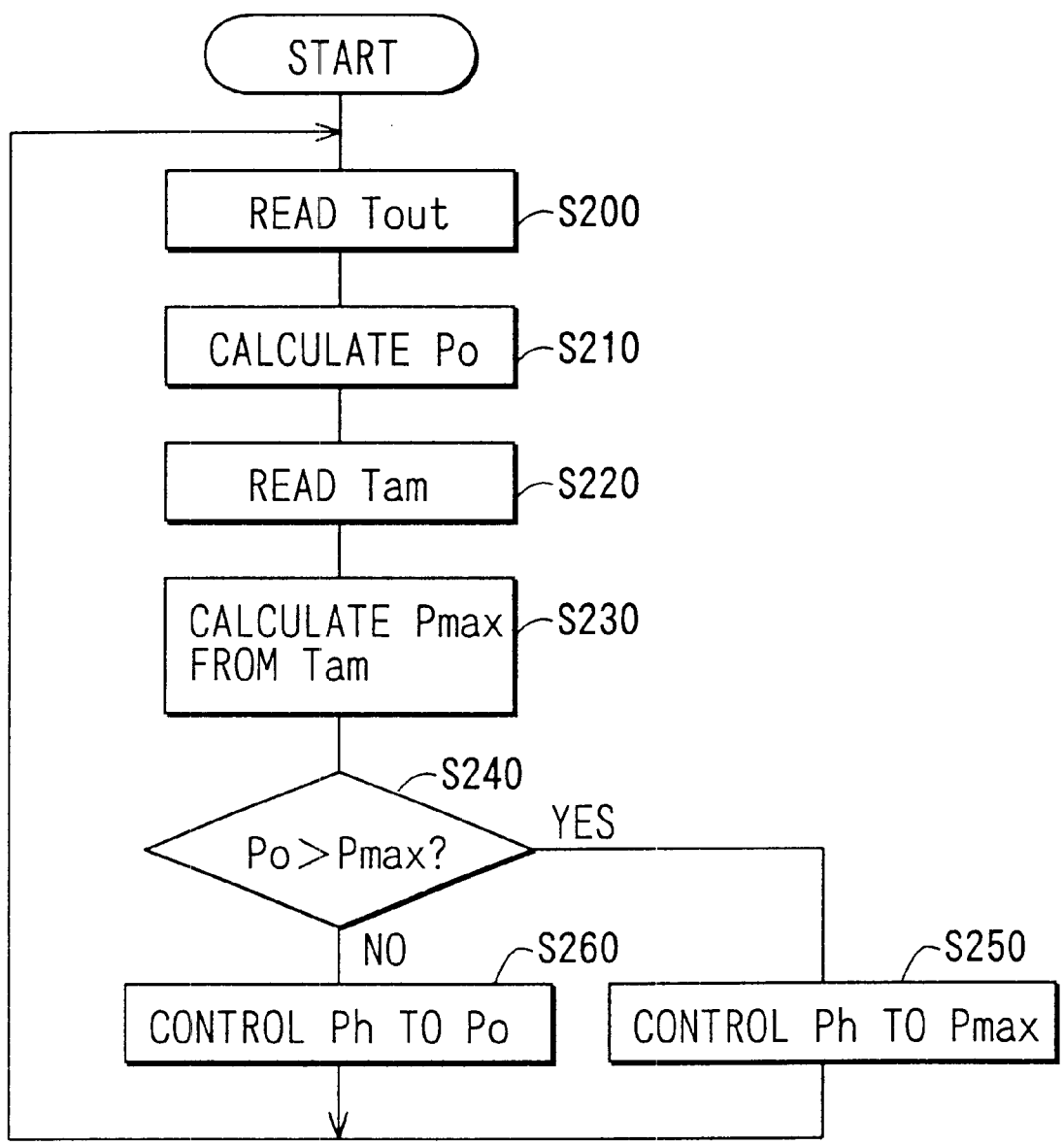
FIG. 6 is a flow diagram showing control operation of a heat pump in a heat pump cycle according to a second preferred embodiment of the present invention.

The control operation of a heat pump cycle according to the second embodiment will be described based on the flow diagram shown in FIG. 6.

When the starting switch of the heat pump is turned on, first, the high-pressure side refrigerant temperature Tout is read at step S200 by using the refrigerant temperature sensor 7 (see FIG. 1) and the target high-pressure side refrigerant pressure Po corresponding to the high-pressure side refrigerant temperature Tout is calculated based on a control map (not shown) at step S210.

Next, an outside air temperature Tam is detected by an outside air temperature sensor (not shown), and is read at step S220, and the permissible maximum pressure Pmax is calculated based on the detected outside air temperature Tam at step S230. Then, it is determined whether the target high-pressure side refrigerant pressure Po is larger than the permissible maximum pressure Pmax calculated at the step S230 or not at step S240. When the target high-pressure side refrigerant pressure Po is larger than the permissible maximum pressure Pmax, the opening degree of the pressure control valve 4 is controlled so that the high-pressure side refrigerant pressure Ph becomes the permissible maximum pressure Pmax at step S250. On the other hand, when the calculated target high-pressure side refrigerant pressure Po is smaller than the permissible maximum pressure Pmax, the opening degree of the pressure control valve 4 is controlled so that the high-pressure side refrigerant pressure Ph becomes the target high-pressure side refrigerant pressure Po at step S260.

(Third Preferred Embodiment)

Figure 7:
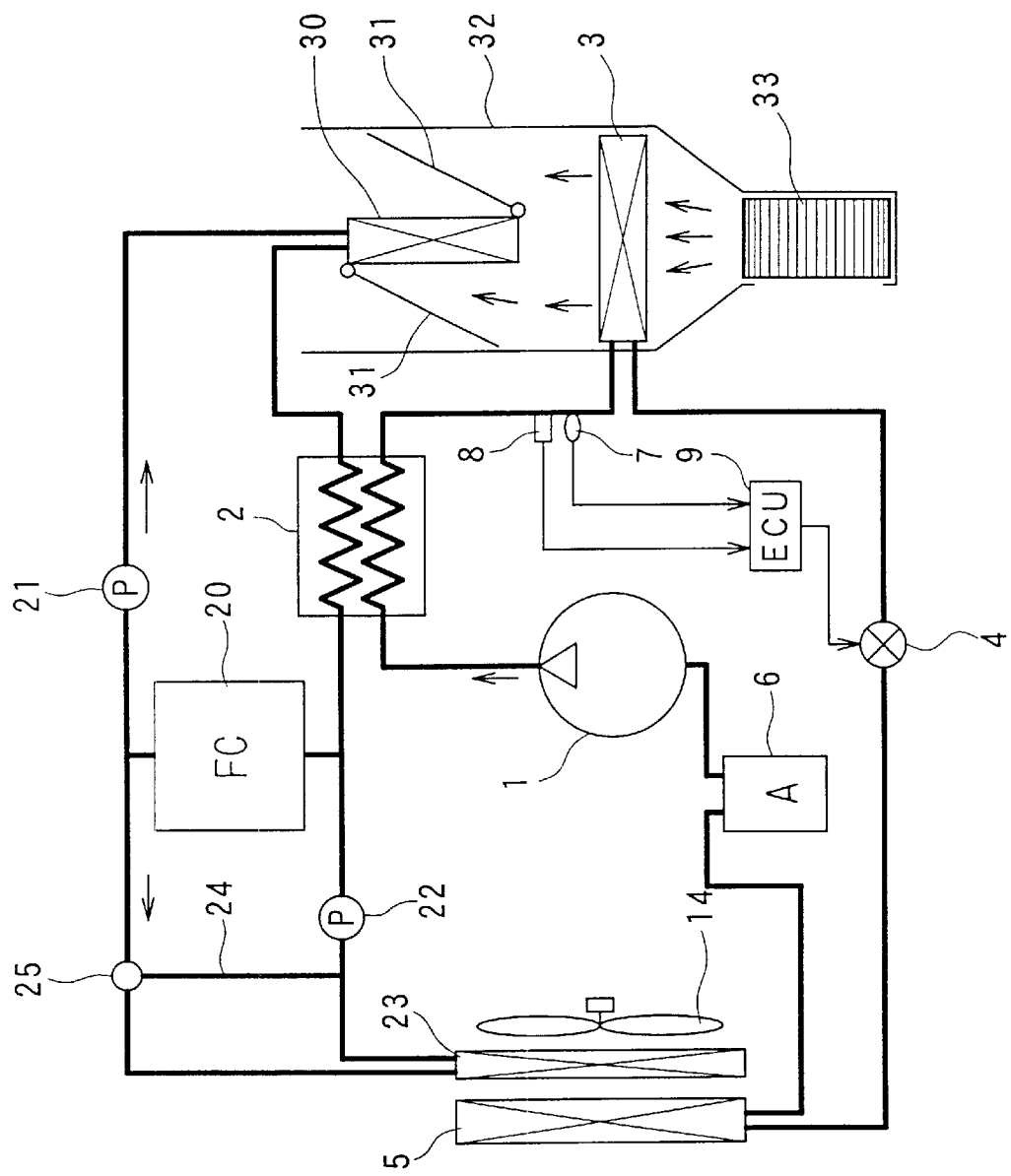
FIG. 7 is a schematic diagram showing a heat pump cycle according to a third proffered embodiment of the present invention.

In the third embodiment, the heat pump in accordance with the present invention is used for heating in a vehicle heater and in a fuel cell (FC stack). FIG. 7 is a schematic diagram of a heat pump cycle in accordance with the third embodiment. Hereinafter, the points different with the above-described first and second preferred embodiments will be now described.

In FIG. 7, there are provided fuel cells (FC stack) 20 for generating electricity by chemically reacting hydrogen with oxygen, and first and second pumps 21, 22 for circulating hot water (cooling water).

The cooling water for cooling the FC stack 20 flows from the FC stack 20, and is cooled by a radiator 23. Further, a bypass circuit 24, through which the cooling water flowing out from the FC stack 20 bypasses the radiator 23 and return to the FC stack 20, is provided. The quantity of the cooling water passing through the radiator 23 and the quantity of the cooling water passing through the bypass circuit 24 are adjusted by a flow control valve 25 for adjusting a flow amount in response to the temperature of the cooling water such as a thermostat to control the temperature of the FC stack 20 at a suitable temperature (about 75° C. to 85° C.)

In this connection, a high polymer electrolytic FC stack, which is thought to be suitable for a driving source of a mobile body such as a vehicle, has a problem that moisture existing near an electrode is frozen to impair the diffusion of a reactive gas and to reduce the electric conductivity of an electrolytic film under a temperature condition below 0° C.

Therefore, when the temperature of the FC stack is not more than 0° C., the FC stack is required to be heated to a temperature over which it can work (a temperature not less than 0° C. where the FC stack can generate electricity). Further, on the contrary, since the FC stack generates heat when hydrogen chemically reacts with oxygen, it is required to be suitably cooled to a temperature where the FC stack is not excessively cooled.

Further, a hot-water heater (interior heat exchanger) 30 is provided for heating air blowing into a vehicle passenger compartment by using cooling water (hot water) heated by the FC stack 20 as a heat source, and a warm air adjustment door (warm air adjustment device) 31 is provided for regulating the quantity of air passing through the hot-water heater 30 and for introducing the heated air into the passenger compartment.

A casing 32 defines an air passage through which air flows into the passenger compartment, and accommodates the hot-water heater 30 and the second high-pressure side heat exchanger 3. In addition, a centrifugal blower 33 is disposed for blowing air into the passenger compartment through the air passage.

In the third embodiment, the first high-pressure side heat exchanger 2 is arranged at a downstream water side of the hot-water heater 30 and heats the hot water flowing into the FC stack 20, and the second high-pressure side heat exchanger 3 is arranged at the upstream air side of the hot-water heater 30 in the casing 32, and heats air flowing into the passenger compartment.

Next, the operation of a heat pump cycle according to the third embodiment will be described.

(1) Warming-Up Operation of the FC Stack 20

When the temperature of the FC stack 20 is low, in order to start the operation of the FC stack 20, the FC stack 20 needs to be heated to increase its temperature (to be warmed up). Therefore, in order to warm up the FC stack 20, the core surface (portion through which air passes) of the hot-water heater 30 is closed by the warm air adjustment door 31 so that air blowing toward the passenger compartment does not pass through the hot-water heater 30. In addition, a cooling water passage, through which cooling water flows through the radiator 23, is closed, and the bypass passage 24 is opened by the flow control valve 25, so that cooling water flows through the bypass passage 24. In this case, the first and second pumps 21, 22, the compressor 1 and the blower 14 for outside air are operated.

In this way, the FC stack 20 is heated to increase its temperature by the hot water heated by the first high-pressure side heat exchanger 2. At this time, since the core surface (i.e., portion through which air passes) of the hot-water heater 30 is closed by the warm air adjustment door 31 and the water passage of the radiator 23 is closed by the flow adjustment valve 25, it can restrict the quantity of the heat which is given to the FC stack 20 by the heat pump, from being radiated outside the FC stack 20.

Figure 8:
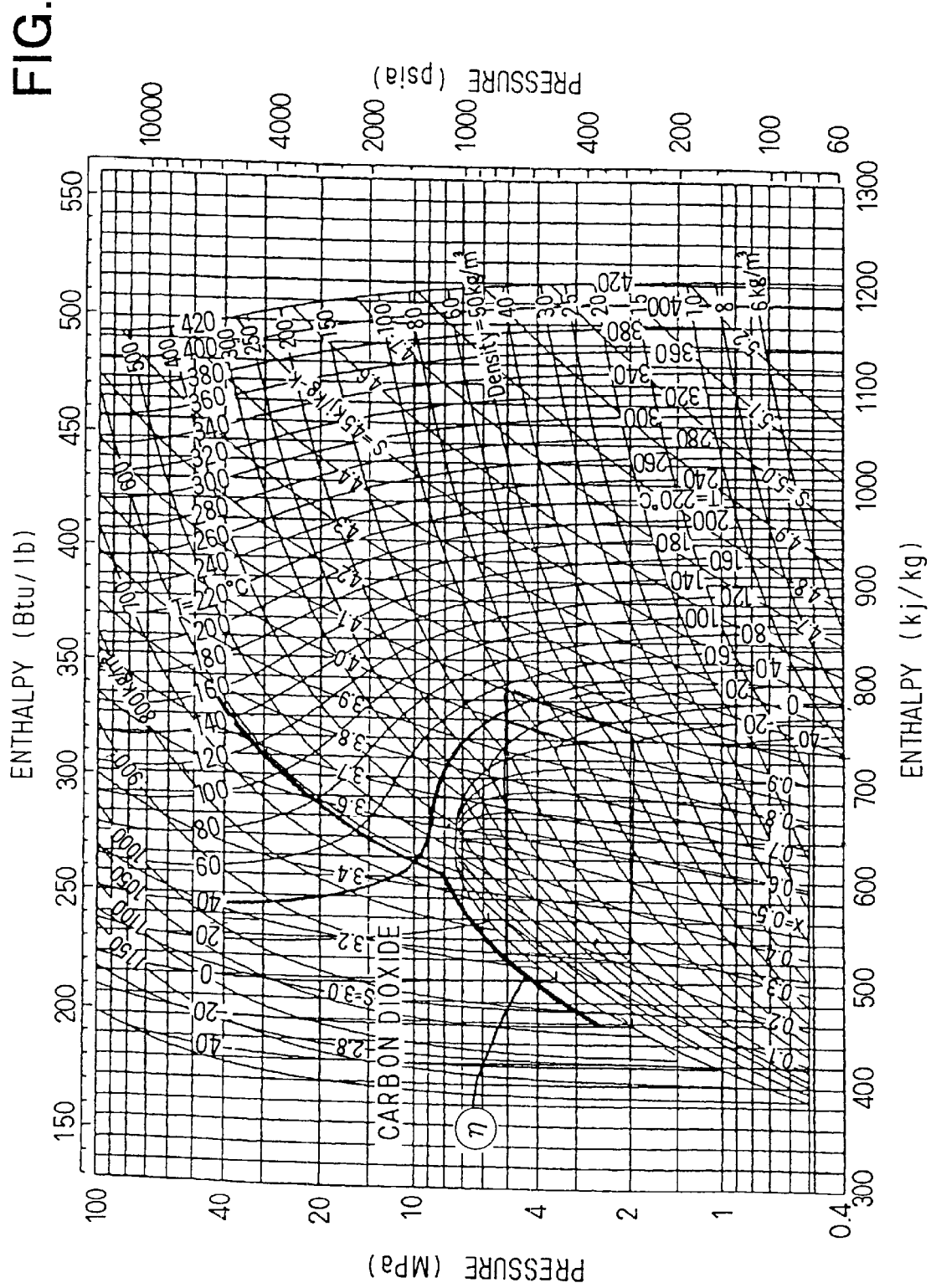
FIG. 8 is a characteristic view of carbon dioxide in the heat pump cycle of the third embodiment.

Further, immediately after the compressor 1 is started, because the temperature of the cooling water is low and the high-pressure side refrigerant temperature Tout detected by the refrigerant temperature sensor 7 is also low, the target high-pressure side refrigerant pressure Po is set at a comparatively low pressure. The tilt of the optimal control line ηmax (pressure/specific enthalpy) is smaller than the tilt (pressure/specific enthalpy) of an equivalent entropy line (line designating a change of state in the compressor 1), as shown in FIG. 8. Therefore, the lower the target high-pressure side refrigerant pressure Po is, the larger quantity of heat (enthalpy) can be extracted by the first high-pressure side heat exchanger 2.

Therefore, when the high-pressure side refrigerant temperature Tout is low immediately after the compressor 1 is started, a larger quantity of heat can be given to the FC stack 20 from the heat pump, as compared with a case where the high-pressure side refrigerant temperature Tout is high. Since the high-pressure side refrigerant temperature Tout is low immediately after the compressor 1 is started, air blowing into the passenger compartment can not be sufficiently heated. Therefore, in this case, the blower 33 is stopped.

In the third embodiment, in order to heat the FC stack 20 and to increase its temperature, at least only the first pump 21 can be made to be operated. However, in the third embodiment, both the pumps 21, 22 are operated to increase the quantity of cooling water circulating in the FC stack 20 to uniformly (without unevenness) heat the whole FC stack 20 to increase its temperature.

(2) After the End of the Warming-Up Operation of FC stack 20:

Because the temperature of the hot water (cooling water) flowing from the FC stack 20 is high (about 80° C. or more) after the warming-up operation of the FC stack 20 is finished, the flow control valve 25 is operated to regulate the quantity of cooling water flowing through the radiator 23 and the quantity of cooling water flowing through the bypass circuit 24 so that the temperature of the hot water becomes about in a range of 75° C.–85° C. At this time, the warm air adjustment door 31 can be operated to open the core surface (portion through which air passes) of the hot-water heater 30 to heat air blowing into the passenger compartment by the use of the exhaust heat of the FC stack 20. When the high-pressure side refrigerant temperature Tout is increased to a temperature enough for heating (about 30° C. to 35° C.), the blower 33 can be operated to heat the air blowing into the passenger compartment.

After the warming-up operation is finished, it is not necessary to heat the hot water flowing into the FC stack 20 by the first high-pressure side heat exchanger 2. However, after the warming-up operation is finished, the temperature of the hot water is increased, so that the first high-pressure side heat exchanger 2 does not substantially exchange heat. Therefore, in the third embodiment, even after the warming-up operation is finished, the compressor 1 is operated so that air is heated in the second high-pressure side heat exchanger 3.

As the temperature of the cooling water increases, the target high-pressure side refrigerant pressure Po increases and the quantity of heat (enthalpy) to be extracted from the first high-pressure side heat exchanger 2 decreases. However, similarly to the first and second preferred embodiments, since the quantity of heat (enthalpy) is extracted also from both the first high-pressure side heat exchanger 2 and the second high-pressure side heat exchanger 3, it is possible to prevent the quantity of heat (enthalpy) to be extracted from the heat pump from decreasing and hence the coefficient of performance (COP) of the heat pump from becoming worse.

(Fourth Preferred Embodiment)

In the above-described third embodiment, an air conditioner is solely used for the heating operation for heating the passenger compartment. However, in the fourth embodiment, an air conditioner is capable of switching between a cooling operation and a heating operation.

In a heat pump capable of switching the cooling operation and the heating operation, the function of a heat exchanger can be switched between the cooling operation and the heating operation. Therefore, in the fourth embodiment to a sixth preferred embodiment described hereinafter, the first high-pressure side heat exchanger 2 is used as a high-pressure side heat exchanger 2, the second high-pressure side heat exchanger 3 is used as an indoor heat exchanger 3, and the low-pressure side heat exchanger 5 is used as an outdoor heat exchanger 5.

Figure 9:
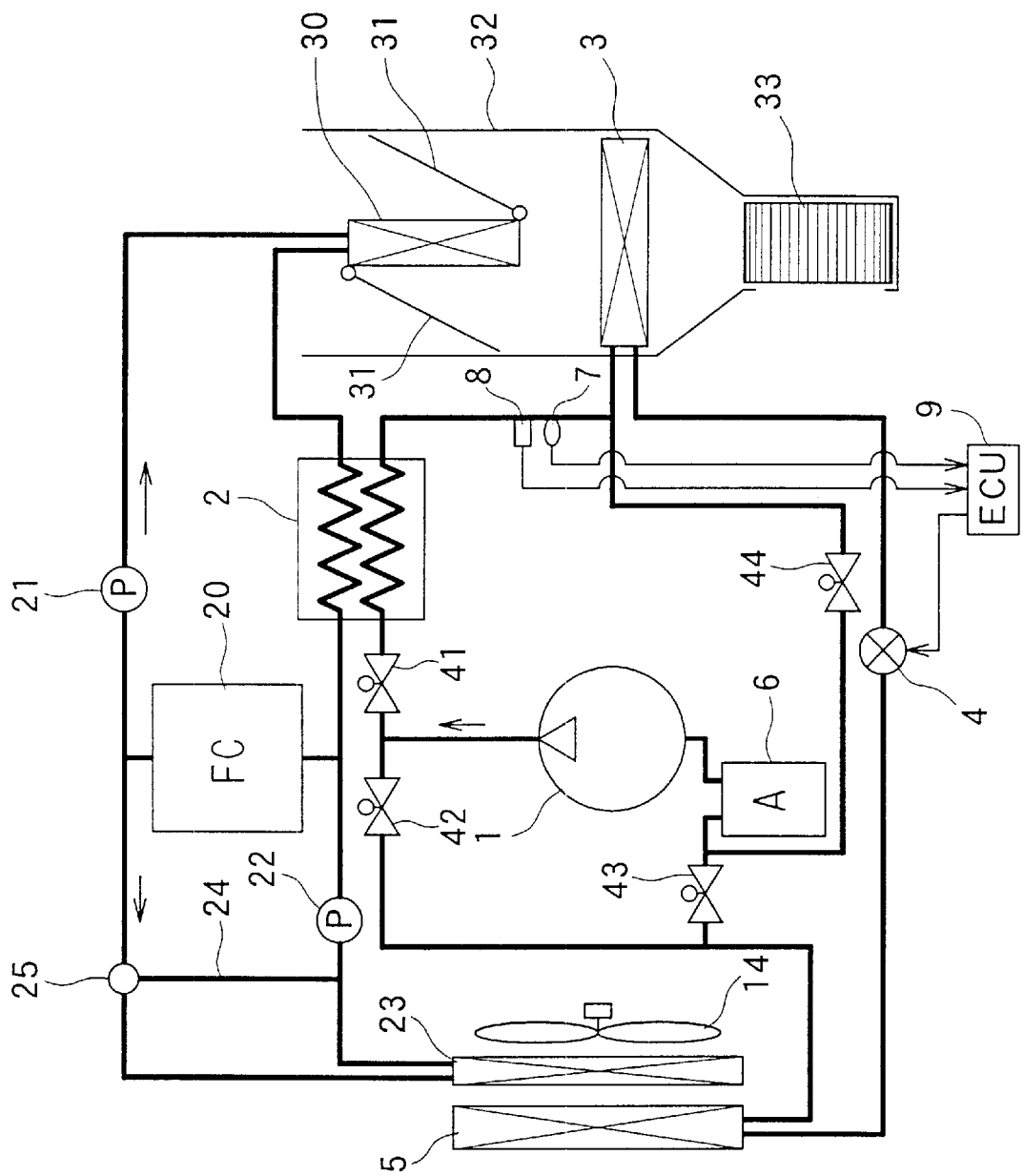
FIG. 9 is a schematic diagram showing a heat pump cycle according to a fourth proffered embodiment of the present invention.
Figure 10:
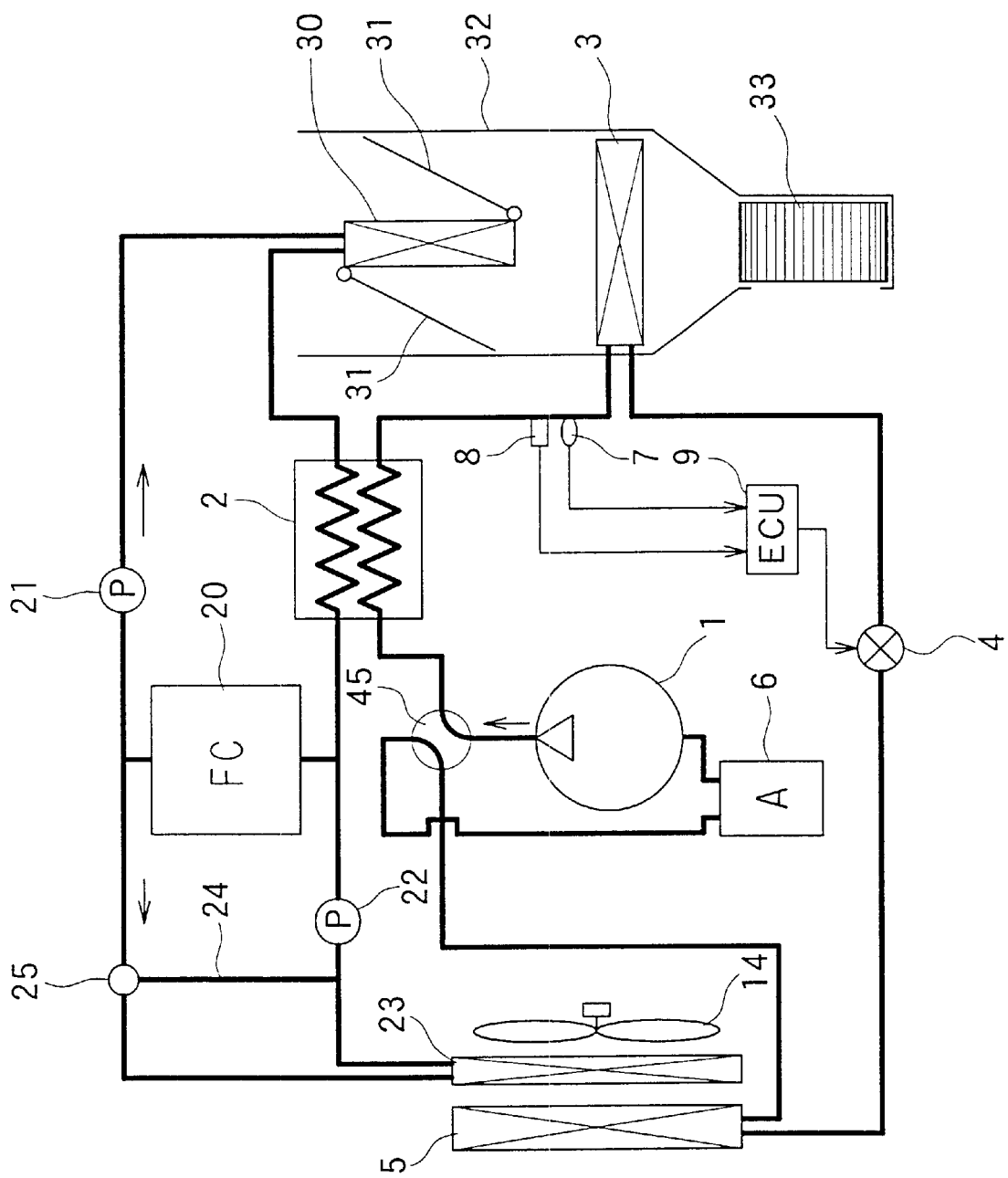
FIG. 10 is a schematic diagram showing a heat pump cycle according to a modification of the fourth embodiment.

Specifically, as shown in FIG. 9 and FIG. 10, valves 41–45 and refrigerant pipes are provided in a heat pump cycle so that, when the warming-up operation is conducted, as is the case with the third preferred embodiment, refrigerant is circulated in the order of the compressor 1→the high-pressure side heat exchanger 2→the indoor heat exchanger 3→the pressure control valve 4→the outdoor heat exchanger 5→the accumulator 6→the compressor 1. Further, when the cooling operation is performed, the refrigerant is circulated in the order of the compressor 1→the outdoor heat exchanger 5→the pressure control valve 4→the indoor heat exchanger 3→the accumulator 6→the compressor 1. Here, the valves 41 to 44 indicated in FIG. 9 are two-way type electromagnetic open/close valves, and the valve 45 indicated in FIG. 10 is a four-way type electromagnetic valve capable of switching a flow passage.

When the cooling operation is performed, the core surface of the hot-water heater 30 (portion through which air passes) is closed by the warm air adjustment door 31 to prevent the air cooled by the indoor heat exchanger 3 from being heated by the exhaust heat of the FC stack 20.

Further, when a dehumidifying operation is performed, similarly to the cooling operation, the refrigerant is circulated in the order of the compressor 1→the outdoor heat exchanger 5→the pressure control valve 4→the indoor heat exchanger 3→the accumulator 6→the compressor 1. In addition, the warm air adjustment door 31 is operated to open the core surface (portion through which air passes) of the hot-water heater 30 to heat the air cooled by the indoor heat exchanger 3 and to increase its temperature.

(Fifth Preferred Embodiment)

In the above-described fourth embodiment, when the cooling operation is performed, the indoor heat exchanger 3 functions as an evaporator (low-pressure side heat exchanger), and when the heating operation is performed, the indoor heat exchanger 3 functions as a radiator (high-pressure side heat exchanger). Accordingly, immediately after the operation is switched from the cooling operation or the dehumidifying operation to the heating operation, the condensed water attached to the surface of the indoor heat exchanger 3 when the cooling operation is performed or when the dehumidifying operation is performed is heated and evaporated. Accordingly, the evaporated steam is blown into the passenger compartment with the heated air, which raises the possibility of presenting a problem that the vehicle window glass fogs.

Figure 11:
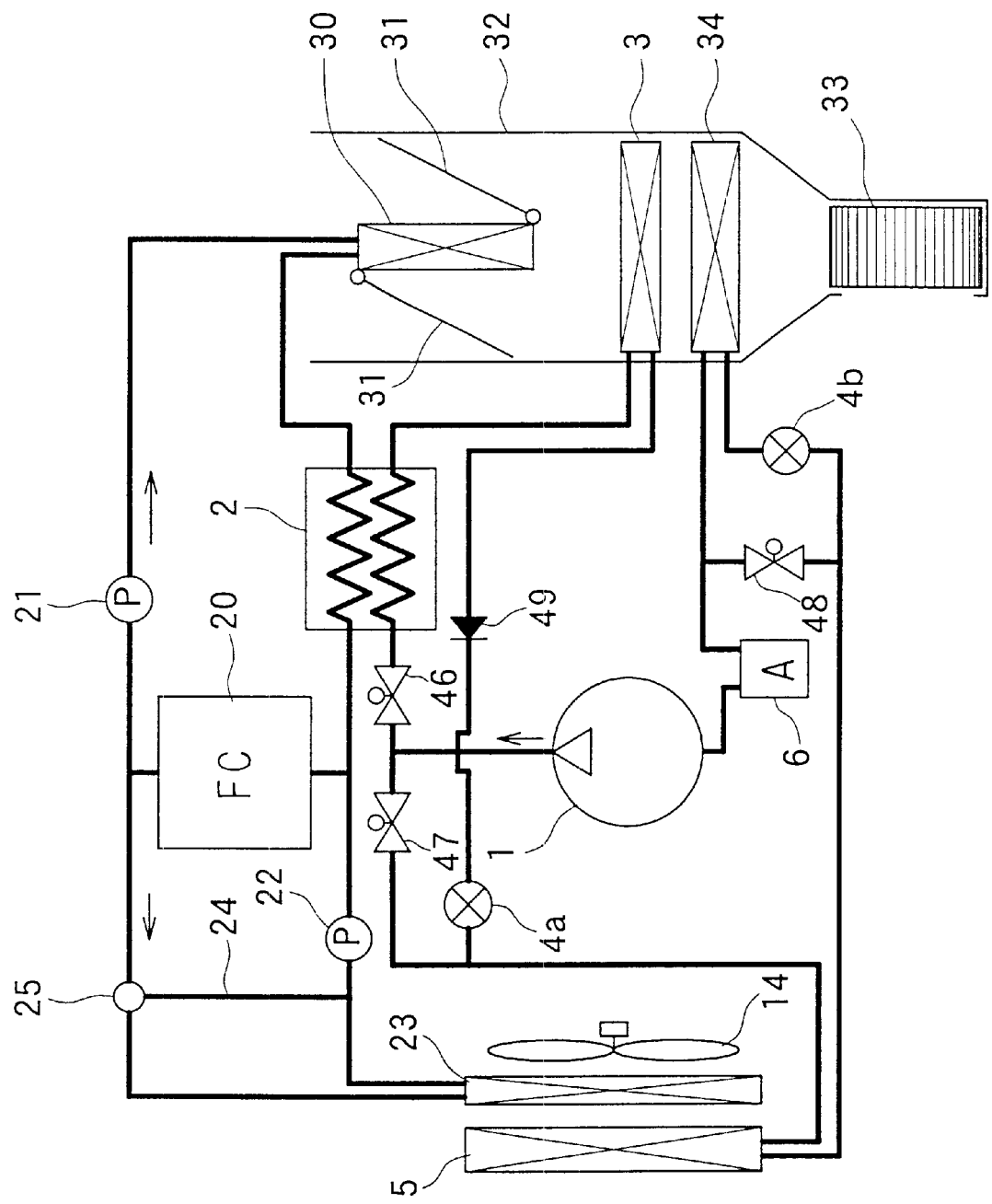
FIG. 11 is a schematic diagram showing a heat pump cycle according to a fifth proffered embodiment of the present invention.
Figure 12:
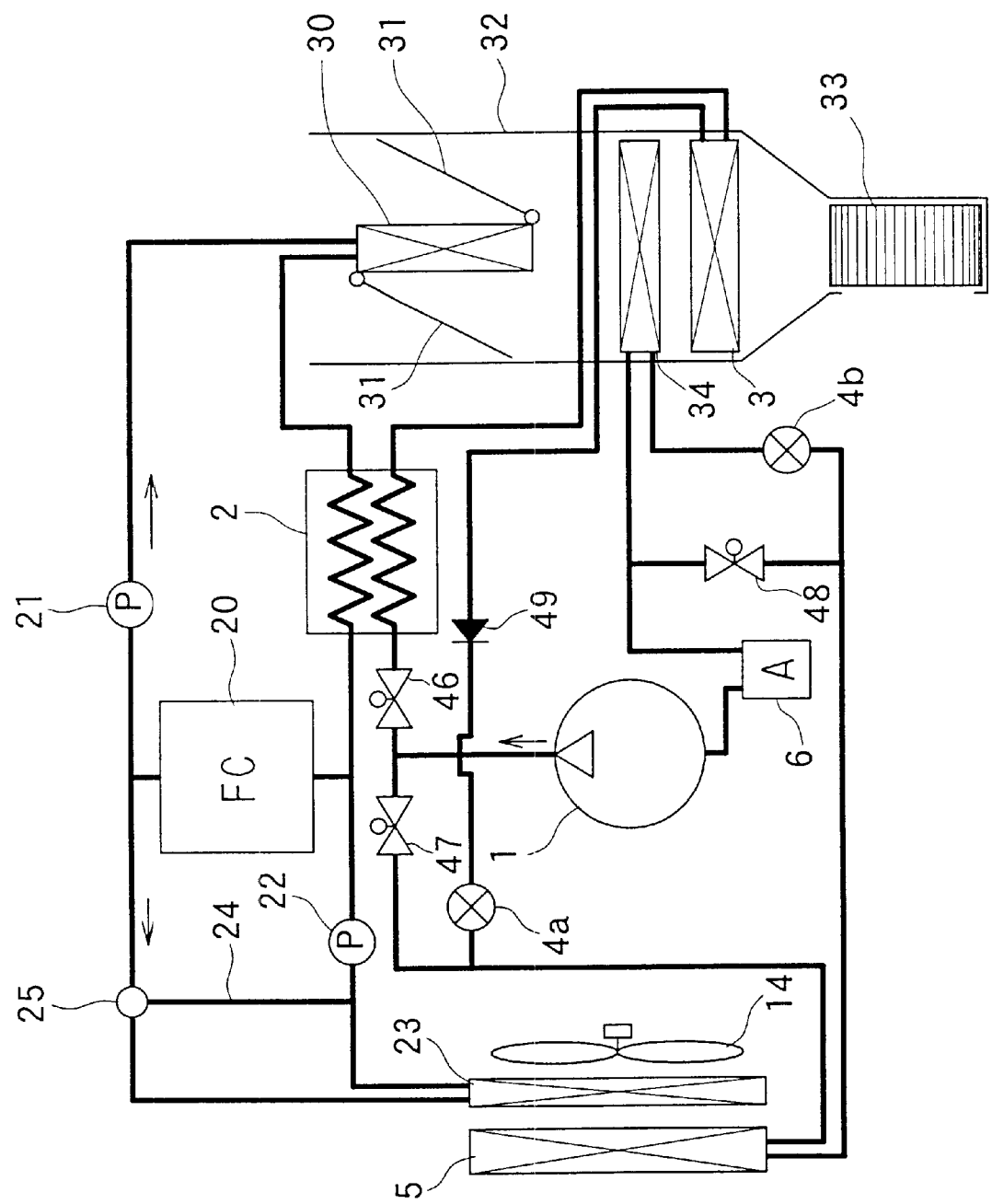
FIG. 12 is a schematic diagram showing a heat pump cycle according to a modification of the fifth embodiment.

Therefore, in the fifth embodiment, as shown in FIGS. 11 and 12, the indoor heat exchanger 3 is made to function as a heat exchanger only used for a radiator (high-pressure side heat exchanger), and a second indoor heat exchanger 34 is only used for an evaporator (low-pressure side heat exchanger) to be positioned in the air conditioning casing 32 in addition to the indoor heat exchanger 3.

In the fifth embodiment, a pressure control valve 4a used for the heating operation and a pressure control valve 4b used for the cooling operation (dehumidifying operation) are disposed. Accordingly, when the heating operation is performed or when the cooling (dehumidifying) operation is performed, the heat pump is operated by the different pressure valve 4a, 4b.

Further, valves 46, 47, 48 for opening or closing a refrigerant passage (piping), and a check valve 49 for allowing the refrigerant to flow from the high-pressure side heat exchanger 3 only toward the pressure control valve 4a is provided. When the heating operation is performed, the refrigerant is circulated in the order of the compressor 1→the high-pressure side heat exchanger 2→the indoor heat exchanger 3→the check valve 49→the pressure control valve 4a→the outdoor heat exchanger 5→the accumulator 6→the compressor 1. On the other hand, when the cooling operation is performed, the refrigerant is circulated in the order of the compressor 1→the outdoor heat exchanger 5→the pressure control vale 4b→the second indoor heat exchanger 34→the accumulator 6→the compressor 1.

When the cooling operation is performed, the core surface (portion through which air passes) of the hot-water heater 30 is closed by the warm air adjustment door 31 to prevent the air cooled by the indoor heat exchanger 34 from being heated by the exhaust heat of the FC stack 20.

Further, when the dehumidifying operation is performed, similarly to the cooling operation, the refrigerant is circulated in the order of the compressor 1→the outdoor heat exchanger 5→the pressure control vale 4b→the second indoor heat exchanger 34→the accumulator 6→the compressor 1, and the warm air adjustment door 31 is operated to open the core surface (portion through which air passes) of the hot-water heater 30 to heat the air cooled by the second indoor heat exchanger 34 to increase its temperature. Accordingly, it can prevent the condensed water on the surface of the indoor heat exchanger 3 from being heated and evaporated when the cooling operation is performed or when the dehumidifying operation is performed. As a result, it can prevent the windshield from fogging.

In the fifth embodiment, as shown in FIG. 11 and FIG. 12, the second indoor heat exchanger 34 may be provided either at the upstream air side or at the air downstream side of the indoor heat exchanger 3. However, because the second indoor heat exchanger 34 functions as an evaporator, the second indoor heat exchanger 34 is generally provided at the upstream air side of the indoor heat exchanger 3, as shown in FIG. 11.

(Sixth Preferred Embodiment)

Figure 13:
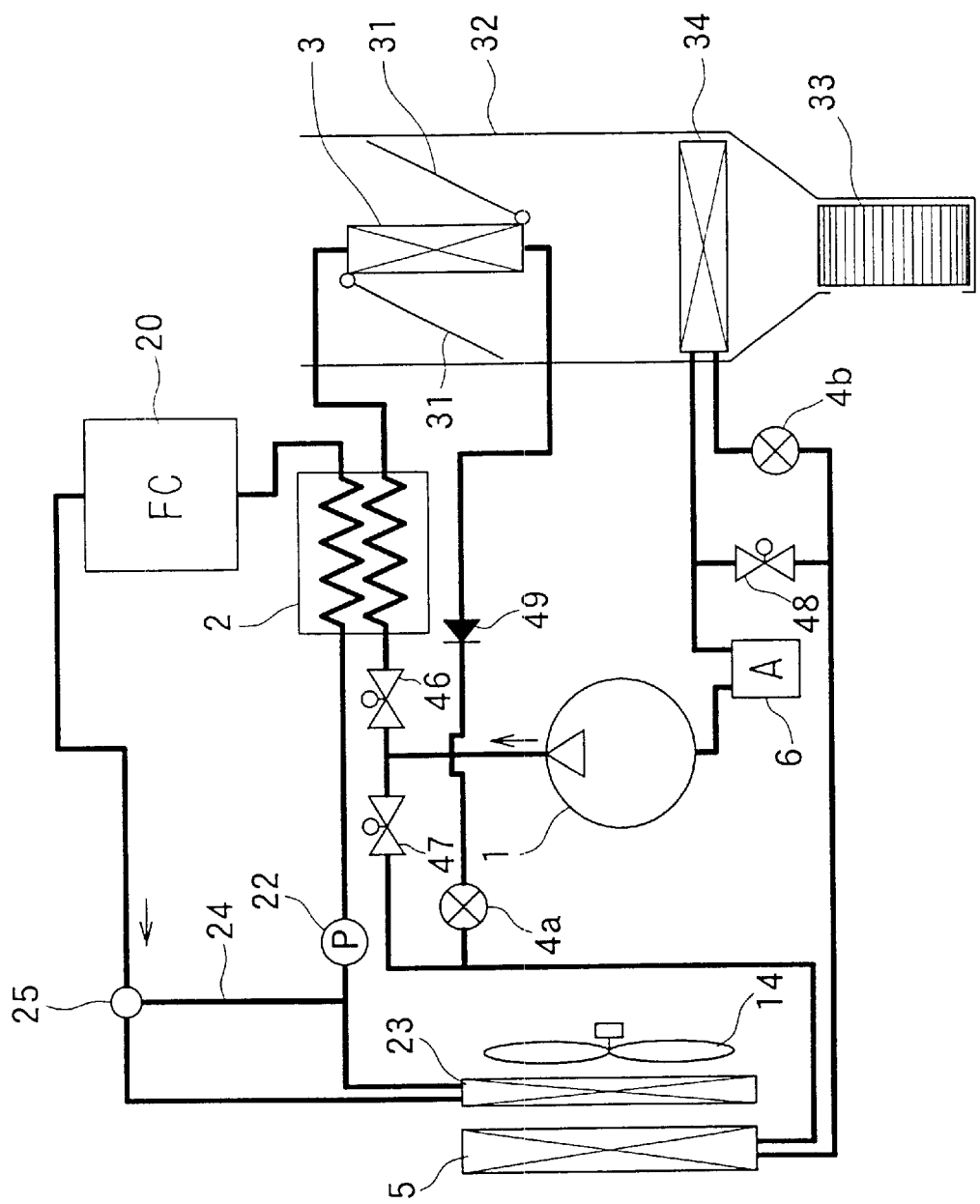
FIG. 13 is a schematic diagram showing a heat pump cycle according to a sixth proffered embodiment of the present invention.

In the sixth embodiment, the cooling operation and the heating operation are performed only by the heat pump. More specifically, as shown in FIG. 13, the hot-water heater 30 is eliminated. In the sixth embodiment, the first indoor heat exchanger 3 is disposed to heat air blowing into the passenger compartment, the second indoor heat exchanger 34 is disposed to cool air blowing into the passenger compartment, and the warm air adjustment door 31 is disposed to control the quantity of air passing through the indoor heat exchanger 3.

Accordingly, when the heating operation is performed, the refrigerant is circulated in the order of the compressor 1→the high-pressure side heat exchanger 2→the indoor heat exchanger 3→the check valve 49→the pressure control valve 4a→the outdoor heat exchanger 5→the accumulator 6→the compressor 1. On the other hand, when the cooling operation is performed, the refrigerant is circulated in the order of the compressor 1→the outdoor heat exchanger 5→the pressure control vale 4b→the second indoor heat exchanger 34→the accumulator 6→the compressor 1. Further, when the dehumidifying operation is performed, the refrigerant is circulated in the order of the compressor 1→the high-pressure side heat exchanger 2→the indoor heat exchanger 3→the check valve 49→the pressure control valve 4a→the outdoor heat exchanger 5→the pressure control valve 4b→the second indoor heat exchanger 34→the accumulator 6→the compressor 1, and the pressure control valve 4a is fully opened to prevent the pressure of the refrigerant from being reduced by the pressure control valve 4a.

In the sixth embodiment, when the cooling operation is performed, the refrigerant can be circulated similarly to the dehumidifying operation, and the quantity of air passing through the indoor heat exchanger 3 is controlled by the warm air adjustment door 31 so that the temperature of air blown into the passenger compartment is adjusted.

(Seventh Preferred Embodiment)

Figure 14:
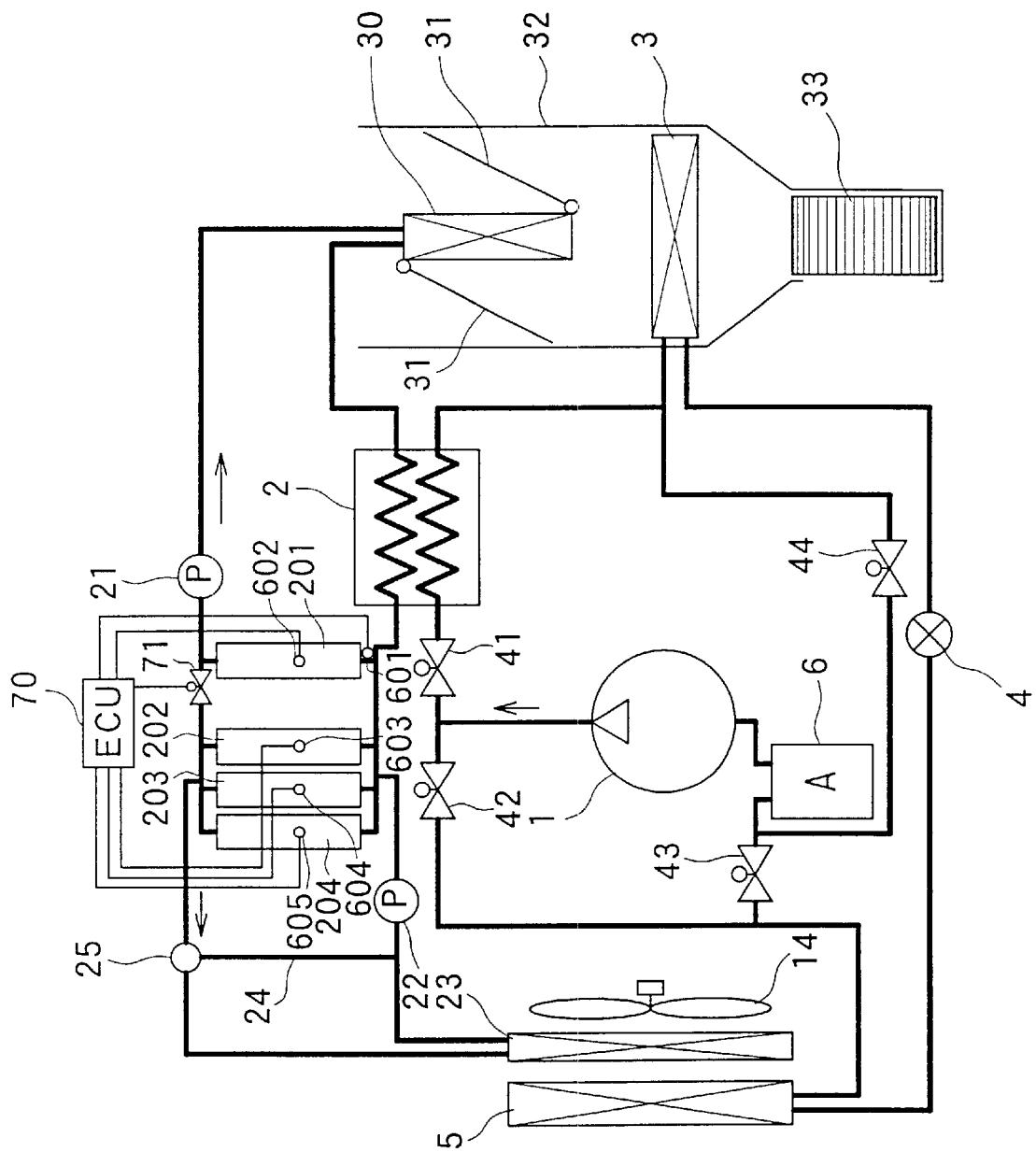
FIG. 14 is a schematic diagram showing a heat pump cycle according to a seventh proffered embodiment of the present invention.

In the seventh embodiment, as shown in FIG. 14, the FC stack 20 is constituted by plural (e.g., four, in the present preferred embodiment) FC stacks 201–204 each having a comparatively small heat capacity, and hot water (water heated by the first high-pressure side heat exchanger 2) is supplied with priority to a part of these FC stacks 201 to 204. Here, the number (one, in the present preferred embodiment) of the FC stacks supplied with the hot water is smaller than the number of the FC stacks 201–204 constituting the FC stack 20. Then, when the warming-up operation of the one FC stack 201 to which the hot water is supplied with priority (hereinafter referred to as first FC stack 201) is finished and it can generate electricity, the hot water is supplied to the other FC stacks 202 to 204.

A valve 71 is disposed to switch a case where the hot water (water heated by the first high-pressure side heat exchanger 2) is supplied only to the first FC stack 201, and a case where the hot water is supplied to all the FC stacks 201–204.

Further, a reference numeral 601 designates a water temperature sensor (hot water temperature detecting device) for detecting the temperature of the hot water flowing into the first FC stack 201, and reference numerals 602 to 605 designate the first to fourth FC temperature sensors (fuel cell temperature detecting device) for detecting the temperatures of the FC stacks 201 to 204, respectively. The temperatures detected by the respective sensors 601 to 605 are input into an electronic control unit (ECU) 70 for controlling the operation of the valve 71.

Figure 15:
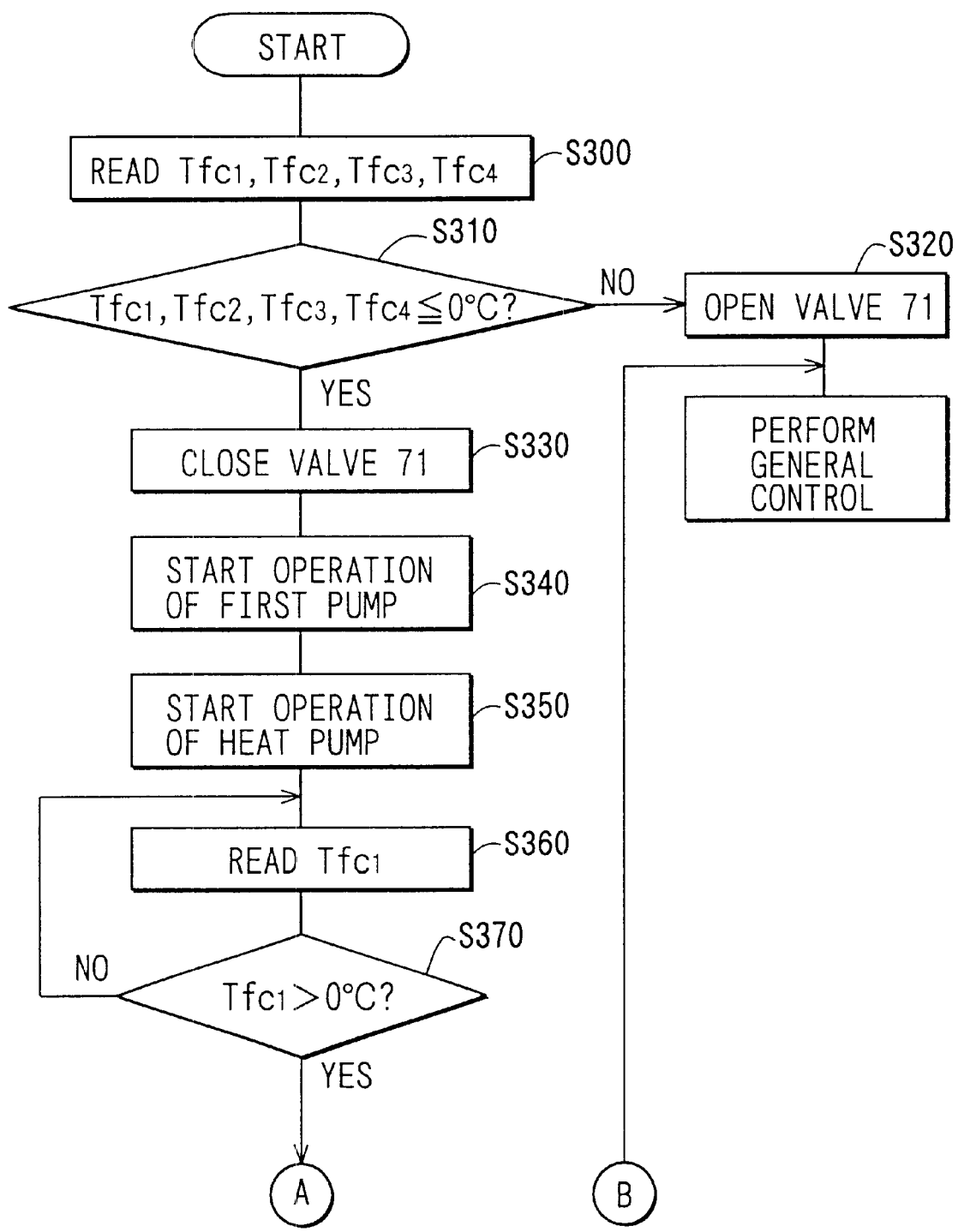
FIG. 15 is a flow diagram showing control operation of the heat pump cycle according to the seventh embodiment.
Figure 16:
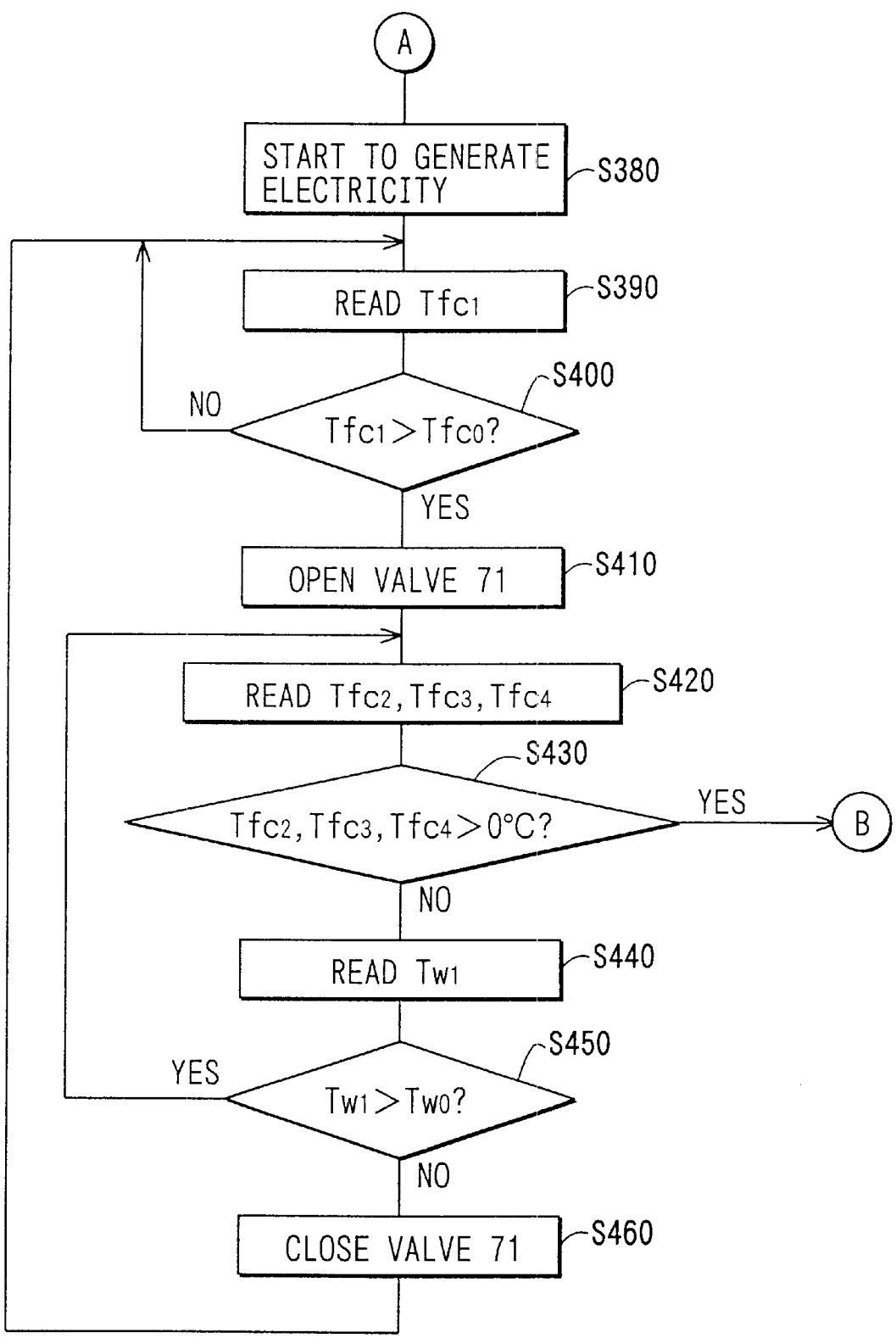
FIG. 16 is a flow diagram showing control operation of the heat pump cycle according to the seventh embodiment.

Next, operation of a heat pump cycle according to the seventh embodiment will be now described based on the flow diagrams shown in FIG. 15 and FIG. 16.

When the starting switch (not shown) of the FC stack 20 is turned on, first, the detection temperatures (first to fourth FC temperatures) Tfc1 to Tfc4 detected by the first to fourth FC temperature sensors 602 to 605 are read at step S300. Then, it is determined whether the first to fourth FC temperatures Tfc1 to Tfc4 are higher than 0° C. or not at step S310. When the first to fourth FC temperatures Tfc1 to Tfc4 are higher than 0° C., the valve 71 is opened so that the hot water can be supplied to all the first to fourth FC stacks 201 to 204 at step S320. Thereafter, a general control is performed. That is, in the seventh embodiment, similar to the third preferred embodiment, during the general control, the quantity of water flowing through the radiator 23 and the quantity of water flowing through the bypass passage 24 are adjusted by the flow control valve 25 to control the temperature of the FC stack 20 to a suitable temperature (normal control).

On the other hand, when the first to fourth FC temperatures Tfc1 to Tfc4 are not more than 0° C., the valve 71 is closed so that the hot water is supplied only to the first stack 201 at step S330, and the first pump 21 and the compressor 1 (heat pump) are operated at steps S340 and S350.

Next, the first FC temperature Tfc1 is read at step S360, and it is determined whether or not the first FC temperature is more than a predetermined temperature (e.g., 0° C.). When the first FC temperature Tfc1 is more than the predetermined temperature (e.g., 0° C.) where electricity can be generated, air (oxygen) and hydrogen are supplied to the first FC stack 201 so that the first FC stack 201 starts to generate electricity at step S380. In this case, closing state of the valve 71 is maintained until the first FC temperature Tfc1 exceeds a predetermined temperature Tfco (e.g., 100° C., in the seventh embodiment) higher than the upper limit temperature of a suitable temperature range, to supply the hot water only to the first FC stack 201 (S390 to S400).

When the first FC temperature Tfc1 exceeds the predetermined temperature Tfco (e.g., 100° C., in the seventh embodiment), the valve 71 is opened so that the hot water can be supplied to all the first to fourth FC stacks 201–204 at step S410. At this time, the temperatures Tfc2–Tfc4 are read at step S420, and it is determined whether the second to fourth FC temperatures Tfc2 to Tfc4 are higher than 0° C. or not at step S430. When the second to fourth FC temperatures Tfc2 to Tfc4 are higher than 0° C. at step S430, similarly to the above-described third preferred embodiment, the quantity of cooling water (hot water) flowing through the radiator 23 and the quantity of cooling water (hot water) flowing through the bypass circuit 24 are controlled by the flow control valve 25 so that the temperature of the FC stack 20 is controlled to a suitable temperature.

On the other hand, when the second to fourth FC temperatures Tfc2 to Tfc4 are not more than 0° C. at step S430, there is the possibility that the first FC stack 201 may be cooled to a temperature under which the electricity cannot be generated. Accordingly, the temperature Tw1 of the hot water flowing into the first FC stack 201 is detected at step S440, and it is determined whether the temperature Tw1 of the hot water flowing into the first FC stack 201 (detection temperature of the water temperature sensor 601) is lower than a predetermined temperature Two (e.g., 50° C., in the seventh embodiment) lower than the lower limit temperature of a suitable temperature range, at step S450.

When the temperature Tw1 is higher than the predetermined temperature Two, the valve 71 is opened to supply the hot water to all the first to fourth FC stacks 201 to 204. On the other hand, when the temperature Tw1 of hot water is lower than the predetermined temperature Two, the valve 71 is closed to supply the hot water only to the first FC stack 201 at step S460.

Next, the features of the heat pump cycle according to the seventh embodiment will be now described. According to the seventh embodiment of the present invention, the hot water (i.e., water heated by the first high-pressure side heat exchanger 2) is supplied preferentially to a part (e.g., one FC stack 201, in the seventh embodiment) of the FC stacks 201–204 constituting the FC stack 20. That is, the number of the FC stacks supplied with the hot water, is smaller than the number of all the FC stacks 201–204 constituting the FC stack 20. Accordingly, it is possible to start to generate electricity in a short time as compared with the case where one FC stack 20 having a large heat capacity is heated to increase its temperature.

Since only the first FC stack 201 can start to generate electricity in a short time, the amount of electricity generation is small when being viewed from the whole FC stack 20. However, since the first FC stack 201 generating the electricity has exhaust heat, the exhaust heat generated by the first FC stack 201 can be supplied to the other FC stacks 202–204. Therefore, the FC stack 20 can be heated to a temperature where it can generate electricity in a short time, as compared with a case where the single FC stack 20 having the large capacity is heated to a temperature where it can generate electricity.

Before the warming-up operation of the FC stack 20 is finished, that is, before the FC stack is brought to a state where it can generate electricity, the compressor 1 is supplied with electricity by a battery (not shown) to be operated. However, when the compressor 1 is operated only by the battery, the battery may be exhausted (discharged) in a short time.

In the seventh embodiment, it is possible to heat the FC stack 20 and to increase its temperature in a short time to a temperature where the FC stack 20 can generate electricity. Therefore, it is possible to shorten a time period during which the compressor 1 is operated only by the battery. Accordingly, it can prevent the battery from being exhausted (discharged) in a short time.

In the seventh embodiment shown in FIG. 14, the heat pump is described in accordance with the third preferred embodiment, as an example. However, it is not intended to limit the seventh embodiment to this example, but the seventh embodiment can be applied also to heat pumps (heating device of FC stack) relating to the fourth to sixth embodiments.

(Eighth Preferred Embodiment)

Figure 17:
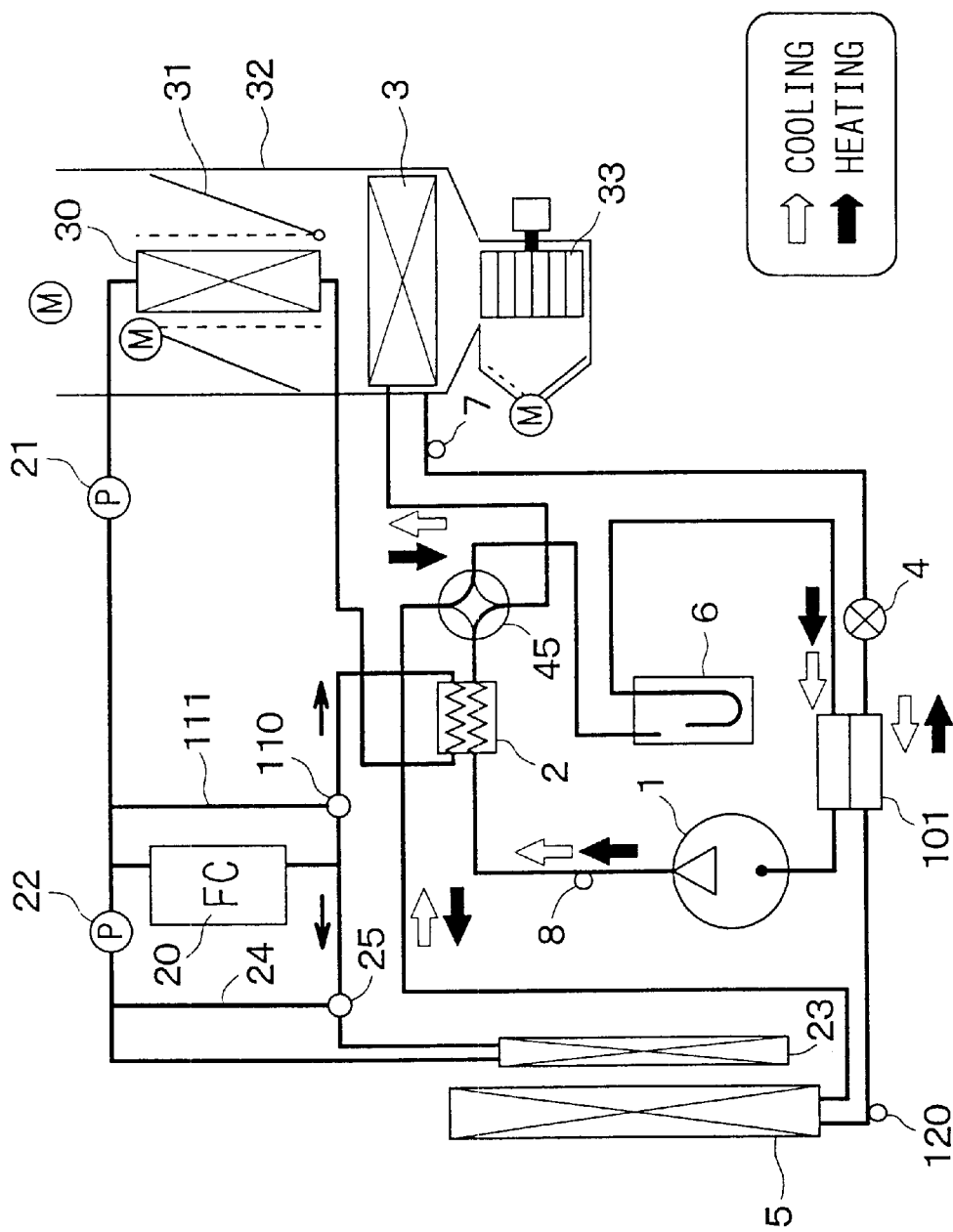
FIG. 17 is a schematic diagram showing a heat pump cycle according to an eighth preferred embodiment of the present invention.

The eighth embodiment is a modified example of the above-described fourth embodiment (FIG. 10). FIG. 17 is a schematic diagram of a heat pump cycle according to the eighth embodiment. In the eighth embodiment, the heat pump cycle is provided with a bypass circuit 111 through which hot water (cooling water) flowing from the FC stack 20 bypasses the hot-water heater 30 to return it to the FC stack 20, a flow control valve 110 for adjusting a flow amount of the hot water passing through the bypass circuit 111 and a flow amount of the hot water passing through the hot-water heater 30, an inside heat exchanger 101 for performing a heat exchange between a high-pressure side refrigerant and a low-pressure side refrigerant in the heat pump, and a refrigerant temperature sensor 120 arranged at a refrigerant outlet side of the outdoor heat exchanger 5.

Next, the operation and the effect of the heat pump cycle according to the eighth embodiment will be now described.

(1) Cooling Operation

When the cooling operation is performed, the refrigerant is circulated in the order of the compressor 1→the first high-pressure side heat exchanger 2→a valve (i.e., four-way type valve) 45→the outdoor heat exchanger 5→the inside heat exchanger 101→the pressure control valve 4→the indoor heat exchanger 3→the accumulator 6→the compressor 1.

On the other hand, the cooling water is circulated in the order of the FC stack 20→the flow control valve 110→the first high-pressure side heat exchanger 2→the hot-water heater 30→the first pump 21→the FC stack 20, in a state where the core surface (portion through which air passes) of the hot-water heater 30 is closed by the warm air adjustment door 31 to prevent the air cooled by the indoor heat exchanger 3 from being heated by the exhaust heat of the FC stack 20.

(2) Heating Operation

When the temperature of the cooling water flowing out from the FC stack 20 is less than a predetermined temperature (i.e., temperature enough for heating), the refrigerant circulates in the order of the-compressor 1→the first high-pressure side heat exchanger 2→the valve (four-way type valve) 45→the indoor heat exchanger 3→the inside heat exchanger 101→the pressure control valve 4→the outdoor heat exchanger 5→the accumulator 6→the compressor 1. On the other hand, the cooling water is circulated in the order of the flow control valve 110→the first high-pressure side heat exchanger 2→the hot-water heater 30→the first pump 21→the bypass circuit 111→the flow control valve 110.

In this way, a part of heat generated by the heat pump is given to the hot water in the first high-pressure side heat exchanger 2 and is discharged into the air blowing into the passenger compartment from the hot-water heater 30, and a part of the other heat generated by the heat pump is discharged into the air blowing into the passenger compartment from the indoor heat exchanger 3.

At this time, the hot-water heater 30 is disposed so that hot water is heat-exchanged with air having been heated by the indoor heat exchanger 3. Since the temperature of the refrigerant of the first high-pressure side heat exchanger 2 is higher than the temperature of the refrigerant of the indoor heat exchanger 3, air heated by the indoor heat exchanger 3 can be further heated by the hot-water heater 30.

Accordingly, the heat pump cycle according to the eighth embodiment can prevent the quantity of heat (enthalpy) to be extracted from the heat pump from being reduced, and hence it can prevent the coefficient of performance (COP) of the heat pump from becoming worse, while the temperature of the air blowing into the passenger compartment can be rapidly increased.

Because the bypass circuit 111 is provided, it can prevent the heat of the FC stack 20 from being discharged by the hot-water heater (air conditioner) 30, and it can finish the warming-up operation of the FC stack 20 in a short time.

When the temperature of the hot water flowing out from the FC stack 20 is higher than the temperature of the hot water flowing out of the hot-water heater 30, the compressor 1 (heat pump) is stopped and the flow control valve 110 is operated to supply the hot water (cooling water) to the hot-water heater 30 from the FC stack 20.

In the eighth embodiment, when the temperature of the cooling water flowing out from the FC stack 20 is not less than the temperature of the cooling water flowing out from the hot-water heater 30, the heating operation is performed only by the exhaust heat of the FC stack 20. However, the heating operation can be performed by both of the exhaust heat of the FC stack 20 and the heat pump.

Although the present invention has been fully described in connection with the preferred embodiments thereof with reference to the accompanying drawings, it is to be noted that various changes and modifications will become apparent to those skilled in the art.

For example, the present invention is applied to the floor heating in the first and second embodiments, and is applied to a fuel cell vehicle in the third to seventh embodiments. However, the present invention can be applied also to the others.

In the above-described seventh embodiment, the present invention can be applied to not only heating the FC stack 20 but also heating a member having a comparatively large heat capacity such as a floor heating and the like.

Further, in the above-described third to eighth embodiments, the FC stack 20 is used as a (exhaust) heat source. However, an internal combustion engine and the other heat generating bodies can be used as a heat source.

In the above-described third through eighth embodiments of the present invention, the refrigerant pressure discharged from the compressor 1 can be controlled to a predetermined pressure based on the refrigerant temperature between the first high-pressure side heat exchanger 2 and the second high-pressure side heat exchanger 3, similarly to the above-described first and second embodiments.

Such changes and modifications are to be understood as being within the scope of the present invention as defined by the appended claims.

What is claimed is:

1. A heat pump cycle comprising:
   a compressor for compressing refrigerant to a pressure higher than critical pressure of refrigerant;
   a first high-pressure side heat exchanger disposed to perform a heat exchange between refrigerant discharged from the compressor and a first fluid;
   a second high-pressure side heat exchanger disposed to perform a heat exchange between refrigerant flowing from the first high-pressure side heat exchanger and a second fluid having a temperature lower than that of the first fluid;
   a decompression unit for decompressing refrigerant flowing from the second high-pressure side heat exchanger, the decompression unit being disposed to control the pressure of refrigerant discharged from the compressor;
   a low-pressure side heat exchanger disposed to evaporate refrigerant decompressed in the decompression unit;
   a refrigerant temperature detecting device for detecting a refrigerant temperature between the first high-pressure side heat exchanger and the second high-pressure side heat exchanger,
   wherein the decompression unit controls the refrigerant pressure discharged from the compressor to become equal to or lower than a predetermined pressure, based on the refrigerant temperature between the first high-pressure side heat exchanger and the second high-pressure side heat exchanger.

2. The heat pump cycle according to claim 1, wherein the predetermined pressure is set to become higher in accordance with an increase of an evaporation pressure of refrigerant in the low-pressure side heat exchanger.

3. The heat pump cycle according to claim 1, wherein the predetermined pressure is set to be changed in accordance with an outside air temperature.

4. The heat pump cycle according to claim 1, wherein the predetermined pressure is set to be changed in accordance with an evaporation temperature of refrigerant in the low-pressure side heat exchanger.

5. The heat pump cycle according to claim 1, further comprising:
   a fluid circuit through which the first fluid from the first high-pressure side heat exchanger circulates; and
   fuel cells disposed in the fluid circuit to generate electricity by chemically reacting hydrogen and oxygen,
   wherein the first high-pressure side heat exchanger is disposed in the fluid circuit to heat the first fluid flowing into the fuel cells.

6. The heat pump cycle according to claim 1, further comprising:
  a fluid circuit through which the first fluid from the first high-pressure side heat exchanger circulates;
  fuel cells disposed in the fluid circuit to generate electricity by chemically reacting hydrogen and oxygen; and
  an air duct defining an air passage through which air used as the second fluid is introduced into a compartment, wherein:
    the first high-pressure side heat exchanger is disposed in the fluid circuit to heat the first fluid in the fluid circuit; and
    the second high-pressure side heat exchanger is disposed in the air duct to heat air flowing through the air passage.

7. The heat pump cycle according to claim 6, further comprising
  a fluid heater in which the first fluid in the fluid circuit flows,
  wherein the fluid heater is disposed in the air duct to heat air using the first fluid as a heating source.

8. The heat pump cycle according to claim 7, wherein the fluid heater is disposed in the air duct at a downstream air side of the second high-pressure side heat exchanger.

9. The heat pump cycle according to claim 1, further comprising:
  an air duct defining an air passage through which air is introduced into a compartment; and
  a heater disposed in the air duct to heat air in the air passage using heat supplied from a heating source, wherein:
    when heat supplied from the heating source is insufficient for heating air, the heater heats air using heat at least from one of the first high-pressure side heat exchanger and the second high-pressure side heat exchanger; and
    when heat supplied from the heating source is sufficient for heating air, the heater heats air using at least heat supplied from the heating source.

10. The heat pump cycle according to claim 9, wherein the second high-pressure side heat exchanger is disposed in the air duct.

11. The heat pump cycle according to claim 9, further comprising:
  a fluid circuit through which the first fluid flows, wherein:
    the heating source is disposed to heat the first fluid in the fluid circuit;
    the first high-pressure side heat exchanger is disposed to heat the first fluid in the fluid circuit; and
    the heater is disposed in the air duct to heat air using the first fluid in the fluid circuit.

12. The heat pump cycle according to claim 11, wherein the second high-pressure side heat exchanger is disposed in the air duct to heat air.

* * * * *